(12) United States Patent
Boulton et al.

(10) Patent No.: US 7,531,271 B2
(45) Date of Patent: *May 12, 2009

(54) WAFER ALKALINE CELL

(75) Inventors: Jonathan M. Boulton, North Attleboro, MA (US); Stuart M. Davis, Norfolk, MA (US); George Cintra, Holliston, MA (US); Leslie Pinnell, Framingham, MA (US); Charles E. O'Brien, Revere, MA (US)

(73) Assignee: The Gillette Company, Boston, MA (US)

( * ) Notice: Subject to any disclaimer, the term of this patent is extended or adjusted under 35 U.S.C. 154(b) by 885 days.

This patent is subject to a terminal disclaimer.

(21) Appl. No.: 10/914,738

(22) Filed: Aug. 9, 2004

(65) Prior Publication Data

US 2005/0208381 A1     Sep. 22, 2005

Related U.S. Application Data

(63) Continuation-in-part of application No. 10/803,438, filed on Mar. 18, 2004, now Pat. No. 7,413,828.

(51) Int. Cl.
  H01M 4/64    (2006.01)
  H01M 6/12    (2006.01)
  H01M 6/04    (2006.01)

(52) U.S. Cl. .................. 429/162; 429/206; 429/209; 429/245; 429/185

(58) Field of Classification Search .................. None
See application file for complete search history.

(56) References Cited

U.S. PATENT DOCUMENTS 2,966,538 A    12/1960   Bernot (Continued)

FOREIGN PATENT DOCUMENTS

EP    1 154 507 A2    11/2001

(Continued)

OTHER PUBLICATIONS

Davis, S. M., and Hull, M.N., "Aspects of Alkaline Cell Leakage", Journal of the Electrochemical Society, vol. 125, No. 12, (Dec. 1978), p. 1918-1923.

(Continued)

Primary Examiner—John S Maples
(74) Attorney, Agent, or Firm—Barry D. Josephs; Kevin C. Johnson; Leo J. White

(57) ABSTRACT

A wafer alkaline cell of a laminar structure is disclosed. The cell has a pair of opposing sides comprising at least the majority of the boundary surface of said cell and defining a short cell dimension therebetween. The cell comprises an anode assembly and a cathode assembly bonded together to form a laminate structure. The cell comprises a single plastic frame or two separate plastic frames housing the anode and cathode material. The anode current collector may be precoated with a sealing metal forming an alkaline resistant metal oxide film to improve bonding to the frame. The anode assembly has an anode material therein typically comprising zinc and the cathode assembly has a cathode material therein typically comprising manganese dioxide. The cell is durable and preferably rigid, has elongated leak block paths, and resists electrolyte leakage.

53 Claims, 15 Drawing Sheets

U.S. PATENT DOCUMENTS

| | | |
|---|---|---|
| 3,525,647 A | 8/1970 | Strauss |
| 3,563,805 A | 2/1971 | Deierhoi |
| 3,871,921 A | 3/1975 | Beatty |
| 3,997,365 A | 12/1976 | Feldhake |
| 4,098,965 A | 7/1978 | Kinsman |
| 4,105,815 A | 8/1978 | Buckler |
| 4,119,770 A | 10/1978 | Land |
| 4,137,627 A | 2/1979 | Kinsman |
| 4,145,485 A | 3/1979 | Kinsman |
| 4,177,330 A | 12/1979 | Gordon |
| 4,740,435 A | 4/1988 | Markin |
| 5,279,905 A | 1/1994 | Masfield |
| 6,103,417 A | 8/2000 | Rapell |
| 6,106,973 A | 8/2000 | Sonozaki |
| 6,555,266 B1 | 4/2003 | Woodnorth |
| 6,576,365 B1 | 6/2003 | Meitav |
| 2002/0192545 A1* | 12/2002 | Ramaswami et al. ........ 429/185 |
| 2003/0059673 A1 | 3/2003 | Langan |
| 2003/0165744 A1 | 9/2003 | Schubert |
| 2003/0228517 A1 | 12/2003 | Holl |

FOREIGN PATENT DOCUMENTS

WO      WO 97/03133      1/1997

OTHER PUBLICATIONS

Hull, M.N. and James H.I., "Why Alkaline Cells Leak", Journal of the Electrochemical Society, vol. 124, No. 3, (Mar. 1978), p. 332-339.

Watanabe, J., et. al., Ultra-Thiin Sheet Dry Battery "Paper Battery", Progress in Batteries & Solar Cells, Vil. 3 (1980), p. 118-124.

* cited by examiner

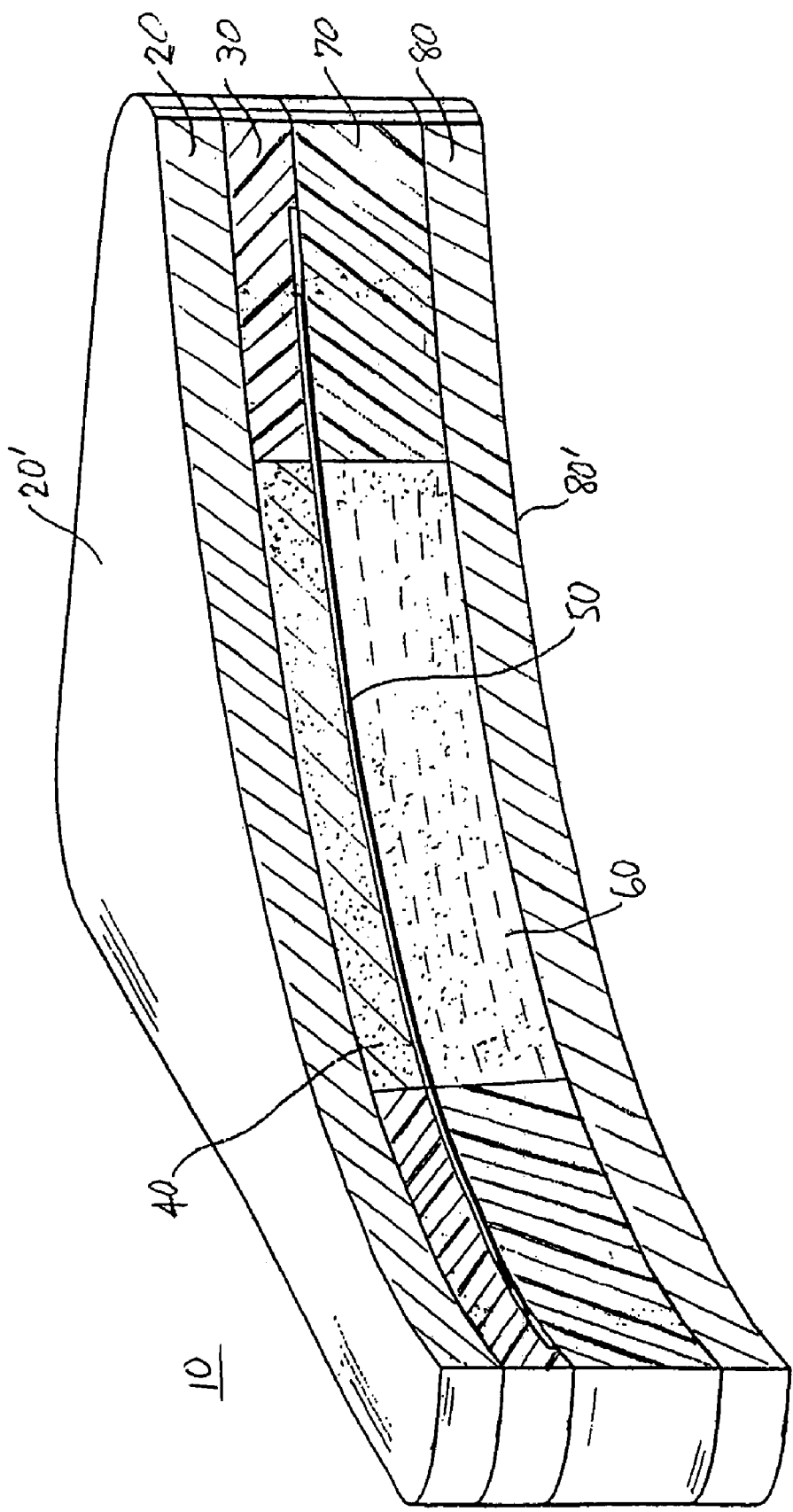

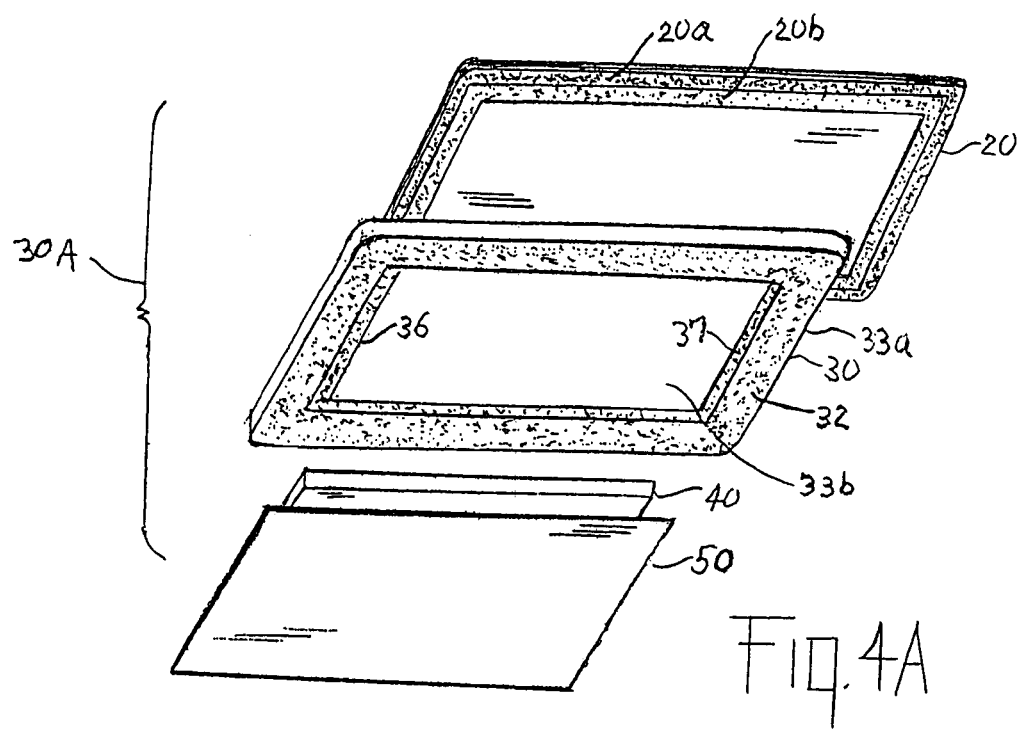
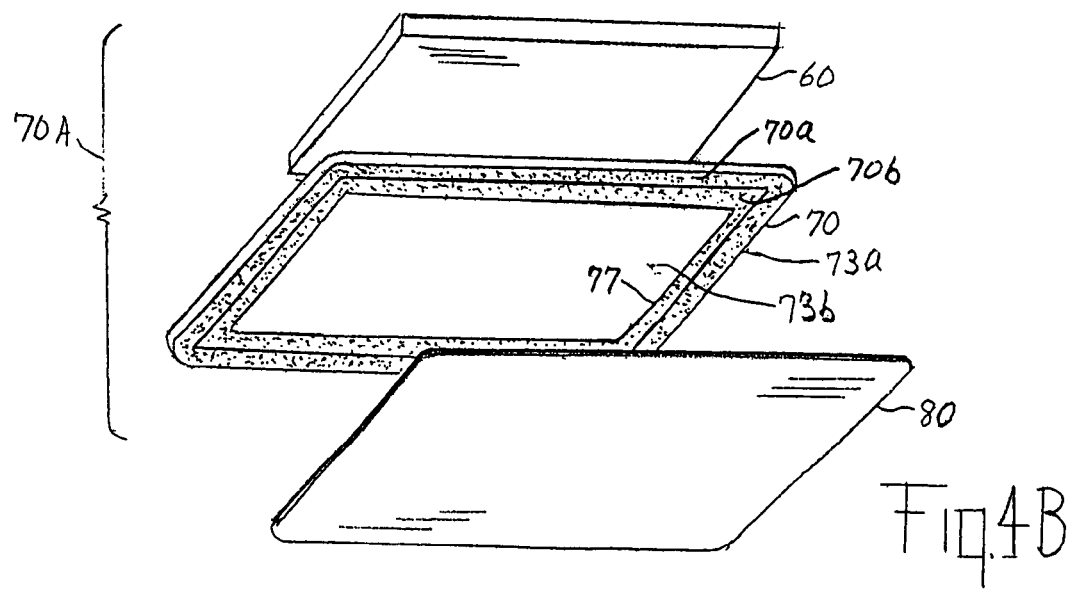

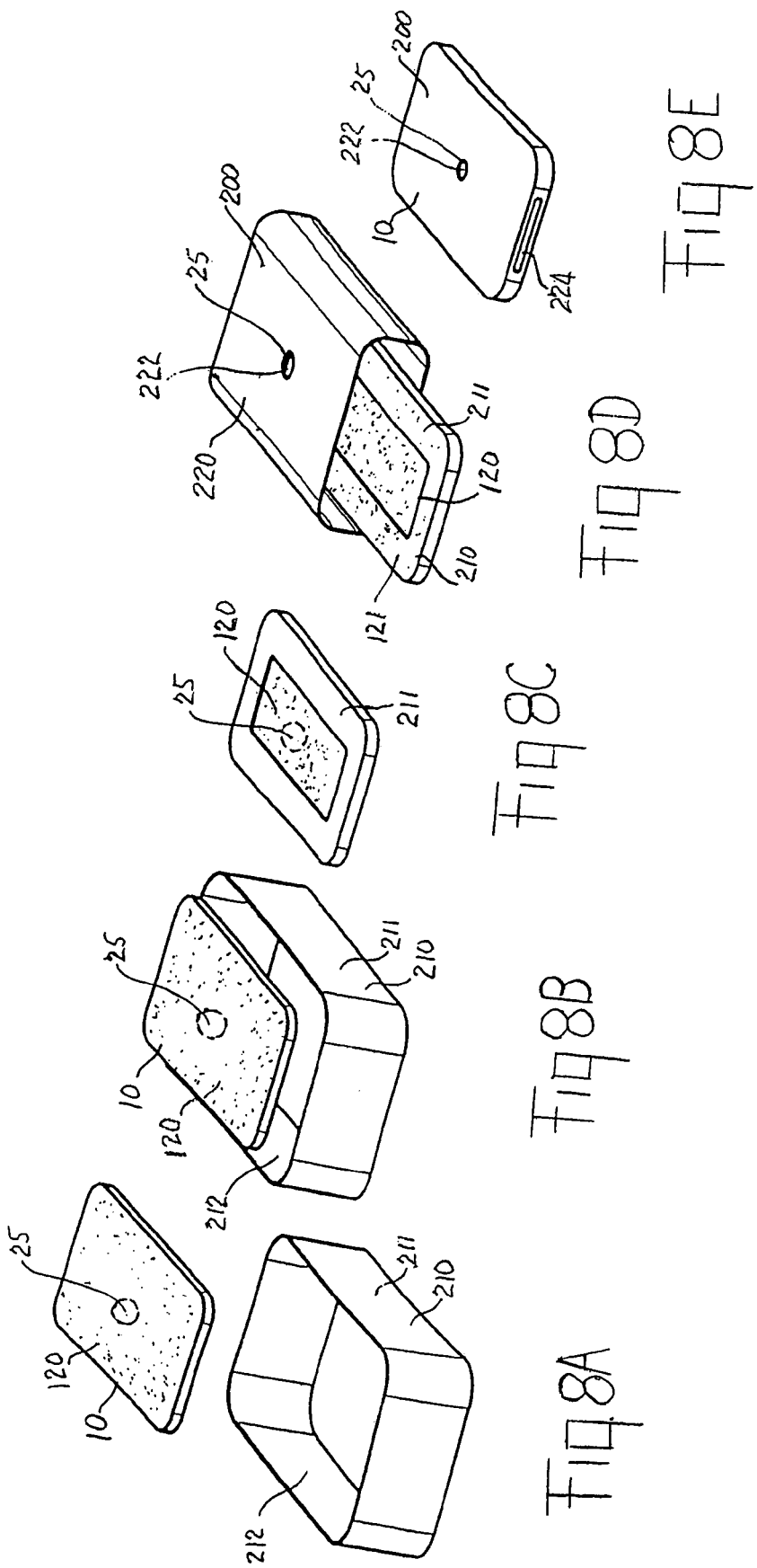

WAFER ALKALINE CELL

CROSS REFERENCE TO RELATED APPLICATIONS

This application is a continuation in part of application Ser. No. 10/803438, filed Mar. 18, 2004 now U.S. Pat. No. 7,413,828.

FIELD OF THE INVENTION

The invention relates to a wafer alkaline battery having a substantially laminar construction and a high aspect ratio of area to thickness. The invention relates to a wafer alkaline cell wherein the anode or cathode current collector is precoated with a sealing metal forming an alkaline resistant metal oxide film to improve bonding. The invention relates to a wafer alkaline cell wherein the anode comprises zinc and the cathode comprises manganese dioxide.

BACKGROUND

Conventional alkaline electrochemical cells have an anode comprising zinc and a cathode comprising manganese dioxide and alkaline electrolyte. The cell is typically formed of a cylindrical outer housing. The fresh cell has an open circuit voltage (EMF) of about 1.6 volt and typical average running voltage of between about 1.0 to 1.2 Volts in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating grommet and radially compressing the housing around the insulating grommet to provide a tight seal. The insulating grommet electrically insulates the negative end cap from the cell housing. A portion of the cell housing at the opposing closed end forms the positive terminal.

Conventional alkaline cells of cylindrical shape are available in a variety of commonly recognizable sizes, namely, AAAA, AAA, AA, C and D size cells. In commonly assigned U.S. patent application Ser. No. 10/722879 filed Nov. 26, 2003 a laminar cell is described wherein the cell contents are encased in a solid metal casing. The metal casing has an integral body surface having a closed end and opposing open end. The cell contents are inserted into the open end, which is then sealed with an end cap. The end cap is designed with a metal skirt, a plastic insulating grommet, and a metal post or rivet, disposed within the grommet. The metal skirt is compressed around the insulating grommet and the grommet is compressed around the metal post to form an alkali resistant seal at both interfaces. The metal skirt of the end cap assembly is then joined to the metal casing by welding.

It becomes increasingly more difficult to fill such cells with anode and cathode material as the desired cell thickness becomes smaller, for example, much under about 6 mm. Thus, there is a need for a flat or laminar alkaline cell, which may be readily fabricated and filled with cell contents even at cell thickness less than about 6 mm, for example, between about 0.5 mm and 6 mm, desirably between about 1.5 and 4 mm. This will make the thin, prismatic alkaline cell available for use as a primary (nonrechargeable) power source or as a back up power source for small electronic devices which may normally be powered by a thin, rechargeable cell, such as a thin lithium-ion cell. By suitable adjustment of the cell chemistry and internal components, a thin alkaline rechargeable cell could also be constructed. Many electronic devices, such as portable radios, audio players, and communication devices have become smaller and thinner in recent years. Thus, there is a need for thin, laminar, wafer cells of small overall thickness for use in such small electronic devices.

Primary alkaline electrochemical cells typically include a zinc anode active material, an alkaline electrolyte, a manganese dioxide cathode active material, and an electrolyte permeable separator film, typically of cellulose or cellulosic and polyvinyl alcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (1/resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, or expanded or exfoliated graphite or graphitic carbon nanofibers and mixtures thereof.

There are small sized rectangular shaped rechargeable batteries now available, which are used to power small electronic devices such as MP3 audio players and mini disk (MD) players. These batteries are typically small and of rectangular shape (cuboid) somewhat the size of a pack of chewing gum. The term "cuboid" as used herein shall mean its normal geometrical definition, namely, a "rectangular parallelepiped". Such batteries, for example, can be in the form of rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. The average running voltage of the F6 or 7/5F6 NiMH rechargeable batteries when used to power miniature digital audio players such as an MP3 audio player or mini disk (MD) players is between about 1.0 and 1.2 volt typically about 1.12 volt.

When used to power the mini disk (MD) player the battery is drained at a rate of between about 200 and 250 milliAmp.

When used to power a digital audio MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

As above mentioned it would also be desirable to have a wafer alkaline cell of overall thickness less than 6 mm, for example, between about 0.5 and 6 mm, preferably between about 1.5 and 4 mm.

It is desired that the wafer cell be designed to minimize or greatly reduce the chance of electrolyte leakage. In references M. Hull, H. James, "Why Alkaline Cells Leak" Journal of the Electrochemical Society, Vol. 124, No. 3, March 1977, pps. 332-329) and S. Davis, M. Hull, "Aspects of Alkaline Cell Leakage", Journal of the Electrochemical Society, Vol. 125, No. 12, December 1978) one aspect of alkaline cell leakage is explained in terms of the electrochemical reduction of atmospheric oxygen in the presence of adsorbed moisture, on the negative, exterior cell terminal to form $OH^-$ ions. These electrochemically generated $OH^-$ ions then attract hydrated positive ions such as $K(H_2O)_x^+$ or $Na(H_2O)_x^+$. The $K(H_2O)_x^+$ or $Na(H_2O)_x^+$ ions originate from the cell interior, migrating across the negative seal surface to the cell exterior, in order to maintain electrical neutrality in the adsorbed film of moisture. The net result is to draw KOH or NaOH electrolyte from the cell interior to the terminal surface and thus in effect to promote migration or creepage of such electrolyte from the cell interior to the terminal surface.

It is also desired that such thin wafer cells should contain enough active material to serve as a long lived power source for a power consuming device. Thus, while thin, the wafer cells should also possess a projected area and a sufficiently large interior volume to contain enough active materials to deliver electrical energy at a substantial rate and for a substantial time.

In the discussion that follows, a wafer cell shall mean a thin, laminar unit cell. The cell may have one or more of its surfaces flat or curved or randomly distorted. The cell may have a uniform thickness or its thickness may vary from point to point. The cell may be symmetrical or unsymmetrical with regard to any point, axis or plane. The "footprint" of the cell is defined as the maximum, orthogonal projected area of the cell on any plane surface, when all possible orientations of the cell have been considered.

The edges of the cell are the outer surfaces, one or more of which will constitute the thickness dimension depending on cell shape. In the case of a cell with varying thickness, the thickness will have a maximum value at some given point. The face of the cell is the one outer surface which defines the footprint of the cell and which has a nominally perpendicular thickness axis. In the case where the cell is flat and of uniform thickness, the area of either face will equal that of the cell footprint. In the case where the cell is either curved, or of non-uniform thickness, or both, the area of either face may match, or exceed that of the cell footprint. In a similar manner, the edges of the cell need not be of uniform thickness.

It would be desirable that such wafer cell be readily manufactured to conform to various overall shapes and sizes, for example, wherein at least one of the sides is polygonal or alternatively circular, oval or at least partially curvilinear.

Thus, it would be desirable to have such wafer cell to be readily manufactured, to enable easy insertion of the cell contents even at such small cell thickness of less than 6 mm. The wafer cell must yet be sturdy and durable enough to withstand internal pressure from evolved gas, resist damage from mechanical abuse and handling and avoid any electrolyte leakage due to seal failure.

SUMMARY OF THE INVENTION

A principal aspect of the invention is directed to a primary or secondary wafer alkaline cell. The wafer cell is designed to function as a source of electrical energy, comprising a negative and a positive terminal, and a pair of opposing sides comprising at least the majority of the boundary surface of said cell. The opposing sides define at some point an average short cell dimension (the thickness) therebetween. The cell comprises an anode assembly and a cathode assembly bonded together to form a laminate structure.

In one aspect the cell can be of a substantially laminar construction which includes various seal interfaces between the conductive and non-conductive elements therein. A sealant is disposed within these interfaces which is resistant to alkaline electrolyte. The seal interfaces containing sealant are protected from peeling and shearing forces through mechanical design features or by the use of a structural adhesive. A novel cell design and over-wrap design is employed to assure that the potential leakage path from the cell interior to either of the two cell terminals is substantially longer than the battery thickness dimension.

In a principal aspect the wafer alkaline cell of the invention has an anode comprising zinc, a cathode comprising manganese dioxide and an alkaline electrolyte, preferably aqueous potassium hydroxide. However, the wafer alkaline cell may have anode and cathode of other active materials and other alkaline electrolytes are possible. For example, the anode may comprise zinc, cadmium or metal hydride alloy and the cathode may comprise manganese dioxide, nickel oxyhydroxide, silver oxide ($Ag_2O$ or AgO alone or in admixture), copper oxide (CuO), silver copper oxide ($AgCuO_2$ or $Ag_2Cu_2O_3$ alone or in admixture with each other or in admixture with $MnO_2$). Each one of the above listed anode materials can be matched up with each one of the above listed cathode materials. The alkaline electrolyte may comprise sodium hydroxide or mixtures of sodium hydroxide and potassium hydroxide, which reduces the tendency of the electrolyte to migrate from the cell interior. The wafer cell may also be in the form of a rechargeable battery.

Included within the anode assembly or within the cathode assembly is a separator layer which may be an ion permeable film, membrane or non-woven fabric. Alternatively, the separator layer may be situated between the anode and cathode assemblies and in some embodiments may project into a portion of the seal area formed by the mating surfaces of the anode and cathode assemblies.

In a specific embodiment the cell is in the shape of a cuboid. The cell may have a shallow thickness, for example between about 0.5 to 6 mm, for example, between about 1.5 and 6 mm, typically between about 1.5 to 4 mm.

In a principal aspect of the invention the anode assembly comprises a housing for said anode, and the cathode assembly comprises a housing for said cathode. A separator layer may be disposed within the anode or cathode assembly so as to face the opposite assembly or the separator may be disposed in between these two assemblies. The anode and cathode assemblies are preferably adhesively bonded together with the separator situated in between the anode and cathode active materials to form a durable, and preferably rigid, compact, laminate structure.

In an aspect of the invention the anode housing, forming a part of the anode assembly, comprises an anode frame, preferably of durable organic polymer material, e.g. a plastic, having an inner peripheral edge defining the boundary of an anode cavity. The frame has a front side and opposing back side along said peripheral edge. An anode current collector sheet is bonded to the back side of the frame so that it faces an outer surface boundary of the cell. The anode material is inserted into said anode cavity so that it is in contact with said anode current collector sheet. The anode current collector sheet is electrically conductive, preferably a metal of copper, brass (alloy of copper and zinc), bronze (alloy of copper and tin), tin or zinc, or of copper or brass plated with zinc, tin, silver, indium or bismuth or combinations of these metals.

The cathode housing, which forms part of the cathode assembly, comprises a cathode frame, preferably of durable plastic, having an inner peripheral edge defining the boundary of a cathode cavity. The frame has a front side and opposing back side along said peripheral edge. A cathode current collector sheet is bonded to the back side of the frame so that it faces an outer surface boundary of the cell. Cathode material is inserted into the cathode cavity so that it is in contact with said cathode current collector sheet. The cathode current collector sheet is preferably of nickel, nickel plated steel or a carbon coated metal sheet, preferably a carbon coated or carbonized nickel sheet. Alternatively, the cathode current collector sheet may be of cold rolled steel, which is plated or clad with nickel. The nickel may be overlayed with carbon, or a layer of cobalt and then a layer of carbon over the cobalt. In another embodiment, the cathode current collector may be overlayed with carbon and then coated with a carbon containing paint.

In another aspect a single frame may be used instead of separate anode and cathode frames. In such embodiment the single frame construction, preferably of plastic, has the advantage that the anode material and cathode can be packed into opposite sides of the single frame avoiding the need to bond individual frames together.

An advantage of the laminate wafer cell structure of the invention is that a cell of essentially any footprint size ranging from very small, e.g., 1 cm$^2$ to very large, e.g. 600 cm$^2$, but yet of small overall thickness, e.g. between about 1.5 and 6 mm, typically between about 1.5 and 4 mm, may be readily fabricated. The cell thickness could even be lower, for example, to as low as about 0.5 mm. Thus the cell can be easily fitted into cavities of electronic devices having small overall thickness. Another advantage of the laminate cell structure is that it may be made to essentially any desired overall shape, for example, polygonal, oval, circular, curvilinear, or partially polygonal and partially curvilinear. The laminate cell of the invention is durable and tightly bonded so that it may be exposed to hot and cold climates and atmospheres of high and low humidity and still resist electrolyte leakage.

In the wafer cell of the invention the chance of electrolyte leakage is reduced by three methods:

1) By creating a very tightly bonded and essentially electrolyte impermeable seal between the cell interior and the anode and cathode current collector sheets.

2) By creating a very long, tortuous path (leakage blocking path) which electrolyte from within the cell would have to take in order to escape from the cell. The total leakage blocking path consists of the sum of the frame width plus the distance from the outer edge of the frame to the exposed cell terminal.

3) By decreasing the surface area of the exposed exterior negative contact to a minimum, thereby decreasing the overall rate of OH$^-$ generation on the exterior negative contact surface.

With respect to electrolyte leak reduction method 1, a tightly bonded, electrolyte impermeable seal is accomplished in the wafer cell of the invention preferably by employing a staged adhesive seal between the edge of the frame and the edge of each of the anode and cathode current collector sheets. The staged seal comprises at least two coatings of different adhesives in a juxtaposed (side by side) arrangement along the edges of the plastic frame in order to bond the current collector sheets to their respective frame. The outer adhesive coating is preferably a structural type adhesive such as an epoxy. Such adhesive imparts structural strength to the laminar cell construction. The inner coating is preferably a adhesive-sealant which may, for example, be a polyamide or functionalized polyethylene, or asphalt. Such sealant coating improves overall bonding but its principal function is to seal out electrolyte. Alternatively, rivets can be employed in addition to or in place of the structural adhesive and the sealant coating can be applied to the portion of the frame between the rivets.

It has been determined that the sealing properties at the interface between the anode current collector sheet and plastic anode frame can be improved by precoating the inside surface of anode current collector sheet with a thin layer of a sealing metal before adhesives are used to bond the anode current collector sheet to the anode frame. Thus, instead of contacting the anode current collector surface directly, adhesives, such as the above mentioned staged adhesives, will contact the sealing metal precoated onto the anode current collector sheet. This has been determined to improve the sealing properties, particularly the long term strength and bond uniformity of the adhesive seal at the interface between the anode current collector sheet and plastic anode frame.

As above described the plastic anode frame surface is bonded to the anode current collector sheet by use of an adhesive therebetween. While a single homogenous adhesive may be used, it is preferred as above indicated to employ a staged seal, that is, two different adhesives in lateral side by side arrangement at the interface between the anode frame and anode current collector sheet being bonded. It has been determined that if the portion of the anode current collector surface in contact with the adhesive is precoated with a specific sealing metal or alternatively if the anode current collector sheet is itself is composed of such sealing metal, the adhesive/metal interface can withstand degradation better over long periods of time, for example, multiple years. A strong, uniform bond between the plastic anode frame and anode current collector sheet is thus preserved over long periods of time reducing the chance of electrolyte leakage through such interface.

By way of example, if the anode current collector sheet is of copper, brass, bronze, tin or zinc, as above enumerated, then magnesium, zirconium or titanium is a preferred sealing metal to be precoated onto that portion of the anode current collector surface in contact with the adhesive bonding the plastic anode frame to the anode current collector. (Magnesium or zirconium has been determined to be a particularly preferred sealing metal for current collector sheets of copper or brass.) Thus, the adhesive, whether a homogenous adhesive or a staged adhesive is used to bond the plastic anode frame to the anode current collector sheet, said adhesive will be in direct contact with the magnesium or zirconium sealing metal precoated onto the facing surface (normally the inside surface facing the cell interior) of the current collector sheet. Such interface bond between the sealing metal and the adhesive appears to withstand degradation over long periods of time thus preserving the bond between the plastic anode frame and anode current collector sheet of the alkaline wafer cell better than if the anode current collector sheet were not precoated with the sealing metal.

Although the preferred sealing metals such as magnesium or zirconium are in their pure elemental form, it is not intended to restrict the sealing metal to pure elemental metals, since alloys of magnesium or zirconium may also be employed. In such case it is preferred to have the magnesium or zirconium or combination thereof as a major component of the alloy. However, benefits can also be realized if the magnesium or zirconium or combination thereof is a minor component of the alloy.

The sealing metal may be applied to anode current collector sheet in a thin coating by utilizing conventional techniques such as, but not necessarily limited to vacuum deposition, sputtering, ion plating, plasma deposition, jet assisted plasma deposition, sintering, cold metal spraying, detonation gun spraying, high velocity oxygen fuel spraying, electroplating (from non-aqueous electrolyte) or by hot dipping (dipping the anode current collector sheet into a bath of the molten sealing metal). The sealing metal may be applied to the inside surface of anode current collector sheet in a uniform thickness of preferably between about 0.10 micron to 50 microns, for example, about 3 micron.

Although magnesium or zirconium are preferred sealing metals for use in the context of the alkaline wafer cell of the invention, other metals can also be used in similar manner with similar beneficial results as a precoat on the anode current collector surface before adhesive is applied thereto to bond the plastic anode frame to the current collector. The list of such sealing metals include magnesium (Mg), zirconium (Zr), titanium (Ti), hafnium (Hf), scandium (Sc), and yttrium (Y) and the lanthanide series elements (La, Ce, Pr, Nd, Pm, Sm, Eu, Gd, Tb, Dy, Ho, Er, Tm, Yb, Lu). Of these elements magnesium (Mg), titanium (Ti), zirconium (Zr), hafnium (Hf), and yttrium (Y) are preferred considering the overall factors of availability, function, and cost.

The present invention is not intended to be restricted to any particular plastic or polymeric material for the anode frame. The anode frame may be composed of a wide variety of plastic materials as long as the plastic is durable and generally resistant to attack by alkaline electrolyte. A preferred material for anode frame for example, is high impact polystyrene (HIPS), acrylonitrile-butadiene-styrene (ABS), polysulfone, or polyvinyl-chloride (PVC) plastic.

Generally, newly fabricated metal sheets or metal structures quickly develop a native metal oxide or metal hydroxide film on their surfaces when exposed to ambient air. Such native metal oxide or hydroxide film can be removed only temporarily and with difficulty in a substantial vacuum in the presence of pure inert gas, in the total absence of traces of water and oxygen. When adhesive or adhesive sealant material is applied to such surfaces an adhesive bond is formed which chemically involves the native metal oxide or metal hydroxide film. The presence of the native metal oxide or metal hydroxide film on the metal sheet or metal structure plays an important role in chemically bonding an adhesive coated plastic surface to the metal structure. That is, chemical bonds between the adhesive and metal oxide or hydroxide are formed in the bonding process. This is generally true of essentially all adhesives or adhesive sealants including the above listed staged adhesive sealants preferred in bonding the plastic anode frame to the anode current collector sheet. However, if any portion of such plastic to metal bonds are exposed to alkaline electrolyte within the alkaline wafer cell, or in general in any alkaline cell, the native metal oxide or hydroxide may be attacked thus gradually weakening the bond. It has been determined that some metal oxides or hydroxides are less prone to attack by alkaline electrolyte than others primarily because they are less soluble in alkaline electrolyte than other metal oxides.

It has been discovered that the above enumerated sealing metals, particularly magnesium and zirconium, when coated onto the surface of an anode current collector sheet, develop a magnesium oxide or hydroxide or zirconium oxide film on the surface of the current collector sheet. Such magnesium oxide or hydroxide or zirconium oxide film is less soluble in the presence of alkaline electrolyte than the native metal oxide film. For example, if the anode current collector sheet is of copper or an alloy of copper (such as brass or bronze) the magnesium oxide or hydroxide or zirconium oxide film which develops on the surface of current collector sheet is less soluble in alkaline electrolyte than the native oxide film, e.g. copper oxide, or copper oxide+zinc oxide, or copper oxide+tin oxide. In this regard precoating the anode current collector sheet with a sealing metal, such as magnesium or zirconium or other of the above enumerated sealing metals, preserves the interfacial adhesive bond against the metal current collector better in an alkaline environment than if the anode current collector sheet was not so precoated, unless of course the current collector sheet itself was formed of the sealing metal.

Another way that an adhesive to metal interfacial bond can be degraded over time is if the native metal oxide or hydroxide film on the surface of the metal being bonded is subjected to oxidation or to reduction due to the environment in which it resides. In terms of bonding the plastic anode frame to the anode current collector sheet in the context of the wafer alkaline cell of the invention, a native oxide or hydroxide film may have a tendency to be reduced by the zinc in the anode if the native metal in the oxide or hydroxide has a more positive electrochemical potential than the zinc. Reduction to a lower oxide or to the metal itself causes volume shrinkage and degradation or loss of the adhesive within the metal interfacial bond. The above enumerated sealing metals, including the preferred metals magnesium and zirconium, have a more negative potential than zinc and therefore cannot be reduced by the zinc. Thus precoating the metal current collector typically of copper or copper alloy (brass or bronze), or tin with a sealing metal such as magnesium or zirconium protects the adhesive to metal interfacial bond from deterioration. This is because oxides or hydroxides of the above listed sealing metals such as magnesium and zirconium are not reduced by direct contact with the zinc anode material or when held at the zinc anode potential in a common body of electrolyte.

The above defined sealing metals apply to alkaline cells in general, regardless of cell configuration. The alkaline cell as defined herein is an "electrochemical cell, which is a primary or rechargeable cell employing an alkaline electrolyte therein". The electrolyte typically comprises aqueous potassium hydroxide but may comprise other alkaline components, for example, sodium hydroxide or lithium hydroxide, and mixtures thereof. A metal/air cell, for example, the zinc/air cell, commonly in the form of a button cell used for hearing aids, is also an alkaline cell because it employs alkaline electrolyte in admixture with the zinc anode active material. The zinc/air cell may also be in the form of elongated cylindrical configurations or other configurations, all of which may be regarded as alkaline cells because of the use of alkaline electrolyte therein. Commercial alkaline cells typically have an anode comprising zinc, usually in particulate form admixed with gelling agent and alkaline electrolyte. The cathode may typically comprise manganese dioxide, nickel oxyhydroxide and the like, as cathode active material. Such cells are considered alkaline cells because of the use of alkaline electrolyte therein.

The alkaline cell has an anode current collector, typically in the form of an elongated metallic member, for example, such as a metallic nail, cup shaped metallic member or metallic sheet. The term "anode current collector" as used herein is an electrically conductive member, normally of metal, having one portion in contact with at least a portion of the anode and another portion in contact with the cell's negative terminal. The anode current collector provides a continuous electrically conductive pathway from the anode to the cell's negative terminal. In some alkaline cells, for example, alkaline button cells such as the zinc/air button cell, the anode casing itself serves as the anode current collector. In alkaline cells a portion of the anode current collector passes through or abuts an electrically insulating member, typically of organic polymeric or plastic material, which electrically insulates the anode current collector from the cell's positive side. This is often referred to in the art as the "negative feed through portion". A portion of the anode current collector (negative feed through) is typically bonded with adhesive material (e.g., asphalt or polyamide based sealant) to the insulating member to provide a good seal therebetween. By precoating said portion of the anode current collector (negative feed through portion) with the above defined sealing metal of the invention, particularly magnesium, zirconium, or titanium, the adhesive bond between the anode current collector and insulating member becomes more alkaline resistant and generally resists degradation better over time than if that portion of the anode current collector were not so precoated with sealing metal. Alternatively, the anode current collector itself as a whole or the portion being bonded to the insulating member may itself be formed of the sealing metal. In this manner the adhesive seal between anode current collector and insulating member is improved and the chance of electrolyte leakage therethrough is reduced.

With respect to electrolyte leak reduction method 2, this involves providing an increased length or relatively long blockage path to reduce the chance of electrolyte leaking from the cell interior to the external environment. In this respect it has been determined desirable to set the length of any potential leakage path, measured from the edge of either active electrode to its corresponding terminal contact on the exterior of the battery, to be substantially greater than the overall cell thickness. In a preferred embodiment herein, the ratio of potential leakage path (leakage block path) to battery thickness is greater than 1.5 and more preferably is greater than 2.

This is achieved by two different means, which may be employed separately or in a cooperative fashion.

In the first means, the width of the plastic frame provides a first leakage block path A. The width of the plastic frame (leakage block path A) is measured from the frame's inner peripheral edge (in contact with battery active material and electrolyte) to its outer peripheral edge, and should be set to approximately as long or longer than the thickness dimension of the cell. Thus, for a 3 mm (⅛") thick cell, the width (A) of the frame is desirably approximately 3 mm (⅛") or greater. While it would be desirable to increase the frame width (leakage block path A) to a maximum in order to deter leakage, it will be appreciated that this will come at the expense of the internal volume available for active material within the cell. Thus, for a given cell footprint (cell side parallel or substantially parallel to the face of the anode or cathode frame), there is an upper limit to the width of the frame that will allow a reasonable amount of active material to be packed into the cell.

In the second means, the exterior surfaces of the cell are desirably covered with a plastic film, adhered to the exterior surfaces of the cell by a sealant, including all of the exposed edges of the plastic frames and also most of the surface of the two conductive endplates (current collector sheets), excluding only a small terminal contact area on each endplate, located at a distance from the outer peripheral edge of the frame. In a preferred embodiment, the exposed contact, e.g. the negative contact, is located on a conductive endplate at the greatest possible distance from all of the outer edges of the frame. Thus, there is defined a distance B from the outer peripheral edge of the anode frame to the exposed negative contact which is at least as long as the cell thickness. The distance B, defines the length of a second electrolyte leak block path (block path B). The distance B is traversed by a film wrap or tape, preferably comprising first and second overlayed shrink film wrap bands, preferably having sealant therebetween and between the first wrap and the cell surface. The sealant between the first film band and the cell and sealant between the two film bands helps to achieve superior electrolyte blocking properties, preventing or greatly retarding the chance of electrolyte leakage along path B. The first plastic film wrap is preferably a shrink band of plastic tubing (peripheral band) applied around the periphery (edges) of the cell. The central axis of the unshrunk band is oriented parallel to the thickness direction. After shrinking, this band covers and adheres to most of the sealant bearing exterior surfaces, including all of the edges and a substantial fraction of the conductive endplates. The cell terminal contact areas are excluded (these remain bare). Thus the potential leakage path is further extended from the outer peripheral edge of the frames towards the vicinity of the cell terminals.

A second plastic film wrap, preferably a shrink band of plastic tubing (lateral band), is applied to the cell, at right angles to the first band. The central axis of the unshrunk band is oriented perpendicular to the thickness dimension. The second shrink wrap (lateral band) is shrunk tight, covering the majority of the remaining exposed surface. The lateral band is furnished with small punched or cut holes which register with the sealant free contact areas on the outer metal endplates, thus exposing the cell terminals. The first and second shrink wrap bands (peripheral band and lateral band), together, cover the entire exterior surface of the cell, with the exception of the cell terminals.

To further enhance leakage resistance, prior to applying the 2nd lateral band, the exterior surfaces of the first shrink wrap band (peripheral band) may be coated with additional sealant, thus effecting a seal between the exterior of the first band (peripheral band) and the second band (lateral band). This assures that the only remaining exit points for any leaked electrolyte are the exposed cell contacts.

In the case where there are separate anode and cathode frames bonded together the first electrolyte leak block path (block path A) as referenced herein may be defined as having a length equal to the width of the anode frame peripheral edge, that is, the width of the frame edge that surrounds the hollow space within the frame. (However, it will be understood that by analogy the width of the cathode frame determines the first block path A on the cathode side of the cell.) In the case where there is a single common frame for housing both the anode and cathode material the first electrolyte leak block path (block path A) is defined as having a length equal to the edge width of this common frame. The second electrolyte leak block path (block path B) as above mentioned is measured as the distance from the outer peripheral edge boundary of the anode frame to the exposed negative contact on the cell surface. The total electrolyte leak block paths A+B is desirably at least between about 1.5 to 4 times the cell thickness and can be even greater for cells having very high footprint area.

With regard to leakage reduction method 3 this is achieved by minimizing the area of the exterior negative contact in proportion to the total area of the cell footprint. Thus, by covering as much of the exterior surface of the negative contact as possible, employing sealant and plastic film, the ratio of exposed contact area to cell footprint area is minimized. Preferably this ratio is less than 5% (for a cell having 1 cm2 to 14.5 cm$^2$ footprint), more preferably less than 1% (for a cell having 14.5 cm$^2$ to 603 cm$^2$ footprint) and most preferably less than 0.1% (for a cell of 603 cm$^2$ or larger footprint).

The arrangement so described is applicable to wafer cells of the invention having various shapes such as square, rectangular, polygonal, circular or elliptical and surfaces which may be flat or curved.

The total leakage path consists of the sum of the frame width plus the distance from the outer edge of the frame to the cell terminal. In the preferred embodiment of the invention, the total leakage path is at least twice the thickness dimension of the cell. More preferably, the total leakage path is at least 3 times the thickness dimension of the cell and most preferably the total leakage path is at least 4 times the thickness dimension of the cell. By covering the cell exterior with sealant and plastic film, the potential leakage path is further extended from the outer peripheral edge of the frames to the cell terminals. Utilizing the design principles herein disclosed, thin alkaline cells of very large area, e.g. 8.5 in×11 in or 93.5 in$^2$ (approx. 21.6 cm×27.9 cm or 603 cm$^2$) or larger may be constructed.

In another aspect the wafer cell may have one or more holes running between and completely through the opposing sides of the cell defining the cell's short dimension. The boundary surface defining any one of said holes preferably does not intersect or touch the boundary surface of any other such hole. The boundary surface defining each hole also does not intersect or touch the cell's outer peripheral edge as defined as the cell's outer edge surface between opposing sides defining the cell's short dimension. In a rectangular wafer cell (cuboid), the holes may desirably be oriented perpendicular to the cell's two opposing parallel sides defining the cell's short dimension therebetween. The holes may be symmetrical or asymmetrical. In particular a hole centrally located along the cell's axis between said two opposing sides of a rectangular wafer cell allows for the wafer cell to be conveniently inserted onto a shaft connected to a device being powered.

BRIEF DESCRIPTION OF THE DRAWINGS

FIG. 1A is a cut away cross sectional view of an embodiment of the wafer cell of FIG. 1 having a dual frame construction.

FIG. 4A is an exploded view of an embodiment showing components comprising an anode assembly.

FIG. 4B is an exploded view of an embodiment showing components comprising a cathode assembly.

FIG. 8A is perspective view showing a shrinkable peripheral film band before it is inserted around the cell edge.

FIG. 8B is perspective view showing a shrinkable peripheral film band being inserted around the cell edge.

FIG. 8C is perspective view showing the cell with the peripheral film band shrunken around the cell edge.

FIG. 8D is perspective view showing a lateral shrinkable film band being inserted around the cell and over the peripheral film band.

FIG. 8E is perspective view showing the cell with the lateral film band shrunken around the cell.

DETAILED DESCRIPTION

Figure 1:
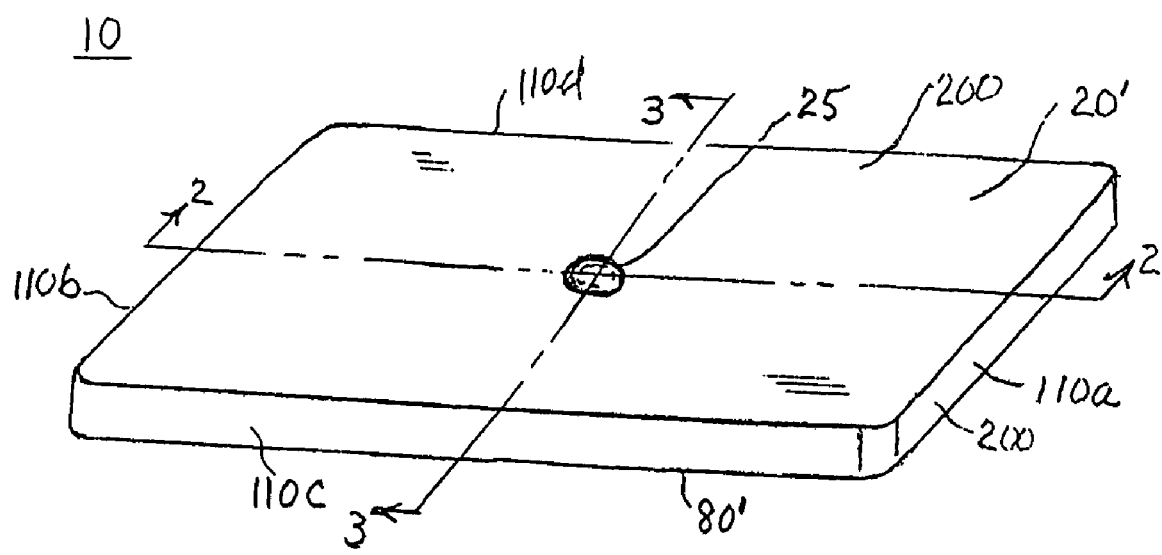
FIG. 1 is a perspective view of an embodiment of the wafer cell of the invention.
Figure 9B:
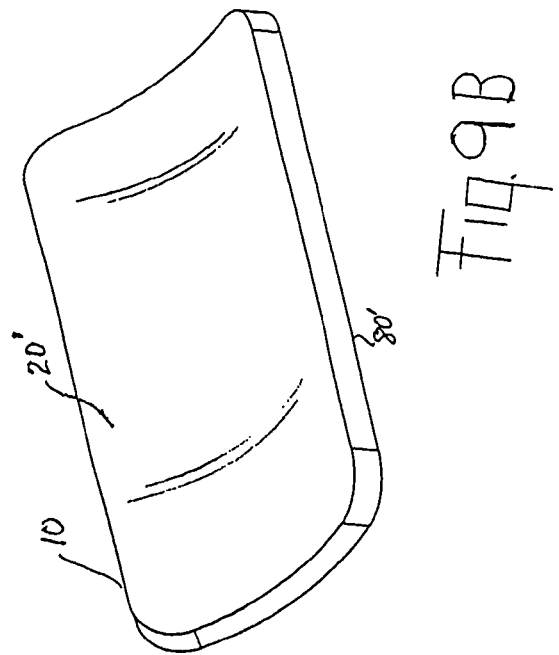
FIG. 9B is a perspective view showing a wafer cell embodiment having a single curved surface.
Figure 9A:
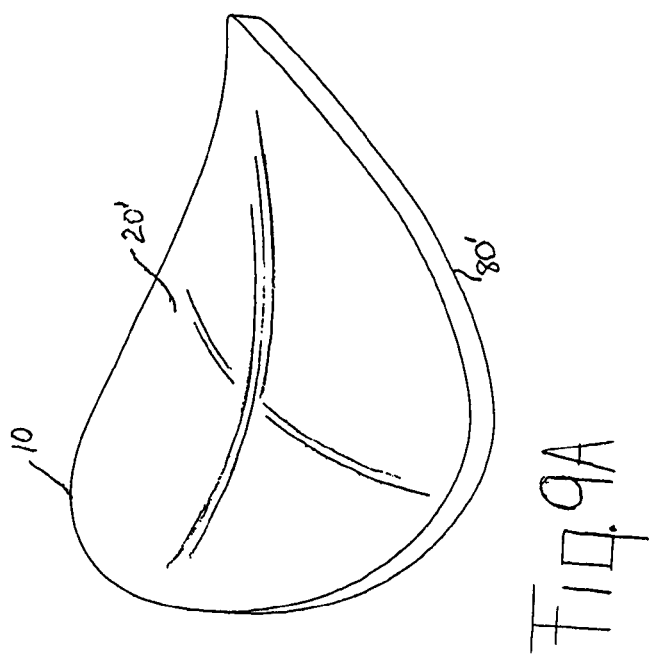
FIG. 9A is a perspective view showing a wafer cell embodiment having a double curved surface.
Figure 9C:
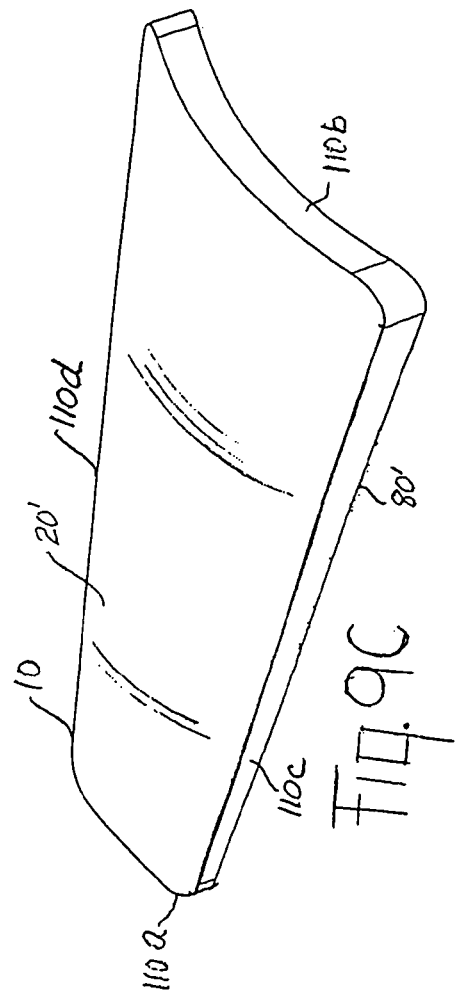
FIG. 9C is a perspective view showing a wafer cell embodiment having a curved surface and nonuniform thickness.

A representative wafer alkaline cell 10 of the invention is shown in FIG. 1. In the embodiment of FIG. 1 the cell has an overall rectangular shape with radiused corners. The cell 10 has two opposing rectangular laminar surfaces 20' and 80' forming the body of the cell and two pair of opposing rectangular end surfaces therebetween, one pair being end surfaces 110a, 110b, and the second pair being end surfaces 110c and 110d. Opposing laminar surfaces 20' and 80' are preferably parallel to each other. Opposing end surfaces 110a and 110b are preferably parallel to each other and opposing end surfaces 110c and 110d are preferably parallel to each other as shown in FIG. 1. Cell 10 is thus in the shape of a cuboid (rectangular parallelepiped) with radiused corners It will be appreciated that the opposing laminar surfaces 20' and 80' may be of other shapes for example, polygonal, and may also be circular, oval, or of curvilinear or partially curvilinear perimeter of varying surface area. Thus the invention is not intended to be limited to a rectangular cell. Opposing laminar surfaces 20' and 80' may be non-parallel. Thus the cell may have a variable thickness, if desired. Opposing laminar surfaces 20' and 80' may not be flat. Thus the cell can possess single or double curvature, with constant or variable thickness, if desired. A cell with a single curvature is shown, for example, in FIGS. 9B and 9C. In FIG. 9B the cell is curved inwardly (concave) when viewed down from top surface 20'. In FIG. 9C the cell is outwardly curved (convex) when viewed down from the top surface 20'. In FIG. 9C the cell is also thinner at one end 110a than at opposing end 110b. Similarly the width of the cell at end 110a may also be different than the width at opposing end 110b. In FIG. 9C the cell's width is smaller at end 110a than at opposing end 110b. The cell surface may also be of multiple curvature. In FIG. 9A a cell of a double (saddle) curvature is shown.

After the cell's laminar structure is formed, for example, as shown in FIG. 1A, one or more plastic film bands can be applied to the cell's surface. The bands are preferably of heat shrinkable plastic material, desirably of polyvinylchloride film. As shown in FIG. 8A the exterior of the cell, with the exception of the cell terminal contact areas 25 and 26, is first covered with a 1st exterior layer of sealant 120 (Adhesive-Sealant B as described below). A first heat shrink wrap, namely, peripheral shrink plastic film band 210 is then applied around the peripheral edge of the cell (FIG. 8B). Band 210 is preferably formed of a closed body surface 211 defining a hollow interior 212. As film band 210 is heat shrunk onto the cell's surface, body 211 of film band 210 folds onto the cell surface and adheres to the 1st exterior sealant layer 120 (FIG. 8 C). A portion of the sealant 120 is left exposed at the center (FIG. 8C) except at the terminal contact area 25. A 2nd layer of exterior sealant 121 (Adhesive-Sealant B as described below) is applied to the outer surface of peripheral shrink plastic band 210, excepting that such sealant 121 may be optionally omitted from the peripheral edges of the cell. A second heat shrink wrap, namely, lateral shrink plastic film band 220, is then applied perpendicular to the peripheral shrink plastic band 210, covering the remaining exposed laminar surfaces 20' and 80'. As lateral film band 220 is heat shrunk onto the cell's surface, it comes in contact with the second sealant layer 121. The lateral band 220, thus becomes adhered to the 2nd sealant layer 121, which was applied over the peripheral band 210. Lateral band 220 also becomes adhered to the exposed portion of first sealant 120 (FIG. 8C), which was applied to the laminar surfaces 20' and 80' but was left uncovered by the peripheral band of shrink plastic 210. The lateral band 220, is provided with a hole 222 which exposes a terminal contact areas 25 and a like hole (not shown) on the opposite face of band 220 which exposes an opposite terminal contact area 26, on the laminar surfaces 20' and 80'. In the specific embodiment shown, for example in FIG. 2, the terminal contact area 25 provides the cell's negative terminal and opposing contact area 26 provides the positive terminal. A small portion of lateral band 220 provides a small aperture or window 224 at open ends of band 220 after band 220 has been shrunk onto the peripheral band 210. A small portion of the underlying peripheral band 210 is shown exposed through window 224 (FIG. 8E).

Preferably the overall thickness of cell 10 is small, for example, between about 0.5 and 6 mm, for example, between about 1.5 and 6 mm, more typically between about 1.5 and 4 mm.

Figure 2:
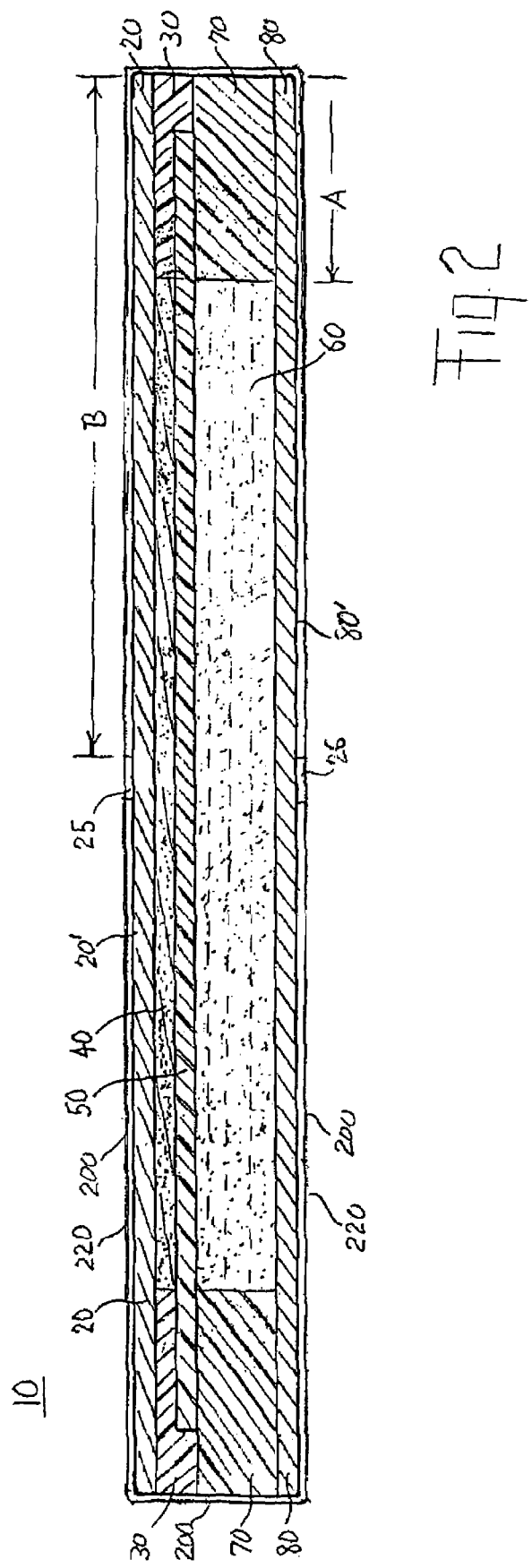
FIG. 2 is cross sectional elevation view of the cell of FIG. 1 taken along site lines 2-2.
Figure 3:
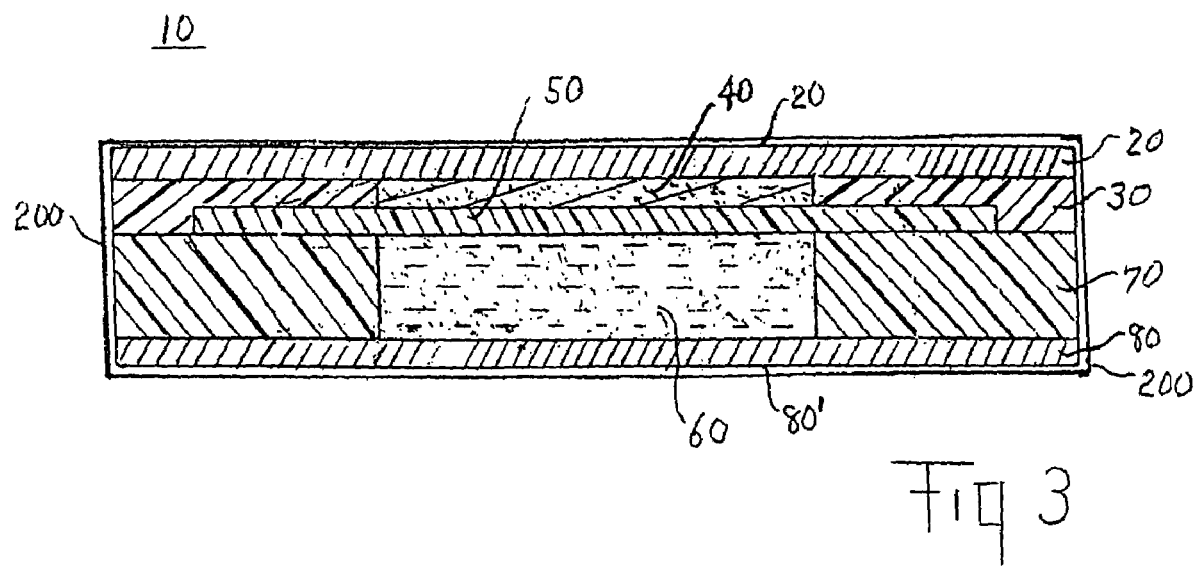
FIG. 3 is cross sectional elevation view of the cell of FIG. 1 taken along site lines 3-3.

A specific construction of cell 10 (FIG. 1) is shown in the cutaway drawing of FIG. 1A along with side and end cross sections FIGS. 2 and 3, respectively. Cell 10 is characterized by first forming an anode assembly such as assembly 30A (FIG. 4A) and then a cathode assembly such as assembly 70A (FIG. 4B). Anode assembly 30A and cathode assembly 70A are then bonded to each other, preferably by adhesives to form the completed cell. The completed cell is preferably coated with sealant and wrapped, preferably twice, in plastic film 200, preferably of heat shrinkable polyvinylchloride. Heat is applied to plastic film 200 to form the cell's label. Other types of outer film wraps 200 can be used, for example, adhesively coated plastic films and heat shrinkable poly-olefins or polyethylene terephthalate (PET) films. As above described the outer film wrap 200 preferably comprises a double wrap, namely, a first film band 210 applied around the peripheral edge of the cell and a second wrap 220 applied laterally over the first film 210.

However, in some instances it may be desirable to apply the lateral film band first and the peripheral band second. The lateral band may comprise a closed loop of film material covering at least a portion of both current collector plate exterior surfaces. Alternatively, the lateral band may comprise a folded piece of film material covering at least a portion of both current collector plate exterior surfaces, being folded over a portion of the edge comprising the thickness dimension of the cell. Alternatively, the lateral band may comprise two separate pieces of film, each one covering at least a portion of each current collector plate exterior surface.

Adhesives or sealants are coated onto or applied to various components at preferred locations. The general type of adhesive and sealants are described and specific preferred ones are specified. However, it will be appreciated that substitutes for the specific adhesives and sealants are possible and accordingly it is not intended that the invention be limited to those given herein. There will be three types of adhesive/sealants used in forming the wafer cell 10 embodiments described herein.

Adhesive A: This is a structural adhesive primarily for imparting holding strength to the components being bonded. It is preferred to employ an epoxy based adhesive for adhesive A. A preferred epoxy adhesive, for example, may consist of a two component epoxy available under the trade designation 2216 from 3M Company. It may also be a single component, heat activated epoxy available under the trade designation non-metallic filled epoxy 2214 from 3M or a UV initiated acrylate adhesive available under the trade designation LC-1211 from 3M or a film adhesive available under the trade designation AF-111 Scotch-Weld film adhesive from 3M.

Adhesive-Sealant B: This is a tacky adhesive which helps to bond components together and also functions as a sealant as well, namely, to seal out and block penetration of alkaline electrolyte. The adhesive-sealant B is preferably applied as a solvent based solution comprising a tacky polyamide. Alternatively, the sealant B may comprise a functionalized polyethylene which is a polyethylene with grafted side groups. A preferred functionalized polyethylene adhesive-sealant is available under the trade name J-43 adhesive from Haerbin Renown Tech. Co. Ltd., China. Alternatively, it may be an asphalt. A preferred sealant B in the form of a solvent based solution comprising a polyamide resin is sold under the trade designation Specseal from Specialty Chemicals Co. Another preferred solvent based solution comprising a tacky polyamide resin is available under the trade names REAMID-100 and VERSAMID-100 (from Henkel Corp. or Cognis Corp.). Such adhesive component is desirably a low molecular weight thermoplastic polyamide resin. Preferred polyamide resins are available under the tradenames REAMID-100 and VERSAMID-100 (from Henkel Corp. or Cognis Corp.). These resins are gels at room temperature that are dimerized fatty acids with molecular weights around 390 and are the reaction products of dimerized fatty acids and diamines. Although higher molecular weight polyamide based adhesive components can be used, the lower weight components are preferred since they are more readily dissolved in the preferred solvent of choice. The adhesive component is dissolved in a solvent to the desired viscosity. Various solvents can be used, such as isopropanol or toluene, as well as mixtures of solvents. Preferably isopropanol is used as the solvent because of its relatively harmless nature when handled. The polyamides have an additional advantage in that they resist chemical attack by potassium hydroxide electrolyte. The adhesive can be applied to cell components employing conventional spray coating techniques including by jet spray method. The adhesive can be applied to provide an adhesive seal between desired surfaces of polymer components, between surfaces of metallic components or between surfaces of polymer and metallic components for the cell.

Adhesive C: This adhesive is used primarily for bonding two plastic components of same or similar plastic material. The preferred adhesive then also has the same polymer base as the plastic material being bonded. For example, if the plastic material being bonded is of high impact polystyrene (HIPS) then the preferred adhesive also contains a polystyrene adhesive resin. Such adhesive can be conveniently applied in the form of a solvent based solution comprising the adhesive resin dissolved in suitable solvent.

In the course of describing the specific embodiments of the invention, the adhesives will be given by reference to the designated adhesive A, B or C as above, unless otherwise indicated.

A preferred anode assembly 30A (FIG. 4A) comprises an anode frame 30, preferably of an organic polymer material, e.g., a plastic, having an outer peripheral edge 33a and an inner peripheral edge 37. Inner peripheral edge 37 surrounds a hollow interior space 33b. Anode frame 30 is preferably comprised of a plastic material which is durable, yet flexible and adhesive bondable. A preferred material for frame 30 is high impact polystyrene (HIPS), acrylonitrile-butadiene-styrene (ABS), polysulfone, or polyvinyl-chloride (PVC) plastic. Anode assembly 30A also comprises anode material 40, an anode current collector sheet 20, and separator sheet 50. Thus, anode frame 30 forms a portion of the housing for anode 40 and also functions as an insulating sealing member preventing contact between the anode current collector sheet 20 and the cell's positive side. Optionally the separator sheet may be included as part of the cathode assembly 70A or as a separate entity between the anode and cathode assemblies. In assembly, current collector sheet 20 may be adhesively bonded to the backside of frame 30 (FIG. 4A). In such embodiment (FIG. 4A) the frame 30 and anode current collector sheet 20 bonded thereto in effect form a housing for anode material 40. A preferred current collector sheet 20 is of copper. Sheet 20 is desirably between about 6 and 10 mil (0.152 and 0.254 mm) in thickness. The current collector sheet 20 is preferably secured and sealed to the backside of frame 30 by employing a staged seal, consisting of a band of structural adhesive 20a (Adhesive A described above) adjacent to the outer edge of the frame and a band of sealant material 20b (Adhesive-Sealant B described above) adjacent to the inner edge of the frame. A single adhesive of homogenous composition may be applied instead of the staged seal, however the staged seal is preferred because it provides a better system for sealing out electrolyte. Spacer beads can be incorporated into the structural adhesive to control the thickness of the adhesive layer. Then anode material 40 may be inserted into the interior space 33b within frame 30 so that it lies pressed against current collector sheet 20. Frame 30 may be provided with a recessed ledge 36 forming the inside edge of the frame. Recessed ledge 36 is preferably coated with adhesive 37. Adhesive 37 may be a solvent based contact adhesive, for example, contact adhesive available under the trade designation 1357-L from 3M Company or a water-based contact adhesive available under the trade designation 30-NF from 3M. A preferred solvent base adhesive for application to ledge 36 comprises a solution of 10 wt. % high impact polystyrene and 90 wt. % toluene. A separator sheet 50 may be inserted over the anode material 40 so that its edge lies against ledge 36 and is bonded thereto by the adhesive coating 37. Alternatively, the edge of separator sheet 50 may be welded to ledge 36 by ultrasound or heat and pressure welding technique. The completed anode assembly 30 is thus in the form of a laminate structure containing the anode material 40 pressed against current collector sheet 20, with the current collector sheet 20 and separator 50 bonded to opposite sides of frame 30.

A preferred cathode assembly 70A (FIG. 4B) comprises a cathode frame 70, preferably of an organic polymer material, e.g. a plastic, having an outer peripheral edge 73a and an inner peripheral edge 77. Inner peripheral edge 77 surrounds a hollow interior space 73b. Cathode frame 70 is preferably comprised of a plastic material which is durable, yet flexible and adhesive bondable. A preferred material for frame 70 is high impact polystyrene, acrylonitrile-butadiene-styrene, polysulfone, or polyvinyl-chloride plastic. Cathode assembly 70A also comprises cathode material 60, and a cathode current collector sheet 80. The cathode current collector sheet 80 is desirably a nickel plated steel sheet, preferably nickel plated steel with a carbon layer over the nickel. The steel sheet may typically be of cold rolled steel. Another suitable cathode current collector sheet 80 may be a nickel plated steel sheet with a cobalt layer over the nickel layer and a carbon paint layer over the cobalt as disclosed in U.S. Pat. No. 6,555,266 B1. Another suitable cathode current collector is a pure nickel sheet, etched and carbonized and coated with a carbon paint coating. The nickel sheet may desirably have a thickness of between about 6 to 10 mil (0.152 and 0.254 mm). The carbon coating on the nickel sheet may be applied by solvent based coating technique, for example, as described in U.S. Pat. No. 6,555,266. The nickel sheet may be carbonized by passing the sheet through a furnace operating at high temperatures wherein carbon deposits onto the nickel surface from a volatilized carbon precursor. This latter technique of depositing carbon onto the nickel surface to form a carbonized nickel surface is described in U.S. Pat. No. 2,051,828 (William F. Dester, Aug. 25, 1936). The use of carbonized nickel current collectors in alkaline cells is described in U.S. Pat. No. 3,713,896 (Ralph H. Feldhake, Aug. 19, 1970).

In assembly, current collector sheet 80 may be adhesively bonded to the backside of frame 70 (FIG. 4B). In such embodiment (FIG. 4B) the frame 70 and cathode current collector sheet 80 bonded thereto in effect form a housing for cathode material 60. Current collector sheet 80 may be bonded to the backside edge 73a of frame 70 preferably by employing a staged seal, consisting of a band of structural adhesive 70a (Adhesive A as described above) adjacent to the outer edge of the frame and a band of sealant material 70b (Adhesive-Sealant B as described above) adjacent to the inner edge of the frame A single adhesive of homogenous composition may be applied instead of the staged seal, however the staged seal is preferred because it provides a better system for sealing out electrolyte. Then cathode material 60 can be inserted into the interior space 73b within frame 70 so that it lies pressed against current collector sheet 80. The completed cathode assembly 70a is thus in the form of a laminate structure containing the cathode material 60 pressed against current collector sheet 20 but, with a portion of the cathode material 60 exposed.

The anode assembly 30A may then be adhesively secured to the cathode assembly 70A to form a single laminate cell structure 10 with anode 40 and cathode 60 material facing each other and separator 50 therebetween (FIG. 1A). Anode assembly 30A and cathode assembly 70A are conveniently bonded together by applying adhesive to the exposed front side of the anode frame 30 (FIG. 4A). The anode frame 30 (between outer edge 33a and inner edge 37) may typically be between about 1/8 to 1/4 inch in width which allows enough room for the adhesive to be applied. The adhesive 32 desirably contains an adhesive resin which is from the same class as the plastic material of frame 30. Thus, if frame 30 is of high impact polystyrene the preferred adhesive 32 is a solution of high impact polystyrene in toluene. Alternatively, if the frame is made from ABS (acrylonitrile-butadiene-styrene) or PVC (polyvinylchloride), a solution of these plastic polymers in toluene or other solvent may be employed. After the adhesive 32 is applied to the front of the anode frame 30, the anode frame 30 is pressed onto cathode frame 70 thus adhesively bonding the anode assembly 30A to the cathode assembly 70a to form a bonded laminate structure forming the completed cell 10 shown in FIGS. 1-3. The completed cell 10 shown best in FIGS. 1A, 2 and 3 is rigid, sturdy, and compact. The bonded laminate cell construction results in a tightly sealed cell, which retains the cell contents therein. As shown in FIGS. 2 and 3 the cell may be coated with one or two layers of sealant and wrapped in one or two layers of plastic film, which is preferably a heat shrinkable film of polyvinylchloride. When heat is applied to the film it shrinks around the cell's boundary surface to form a label.

Figure 7A:
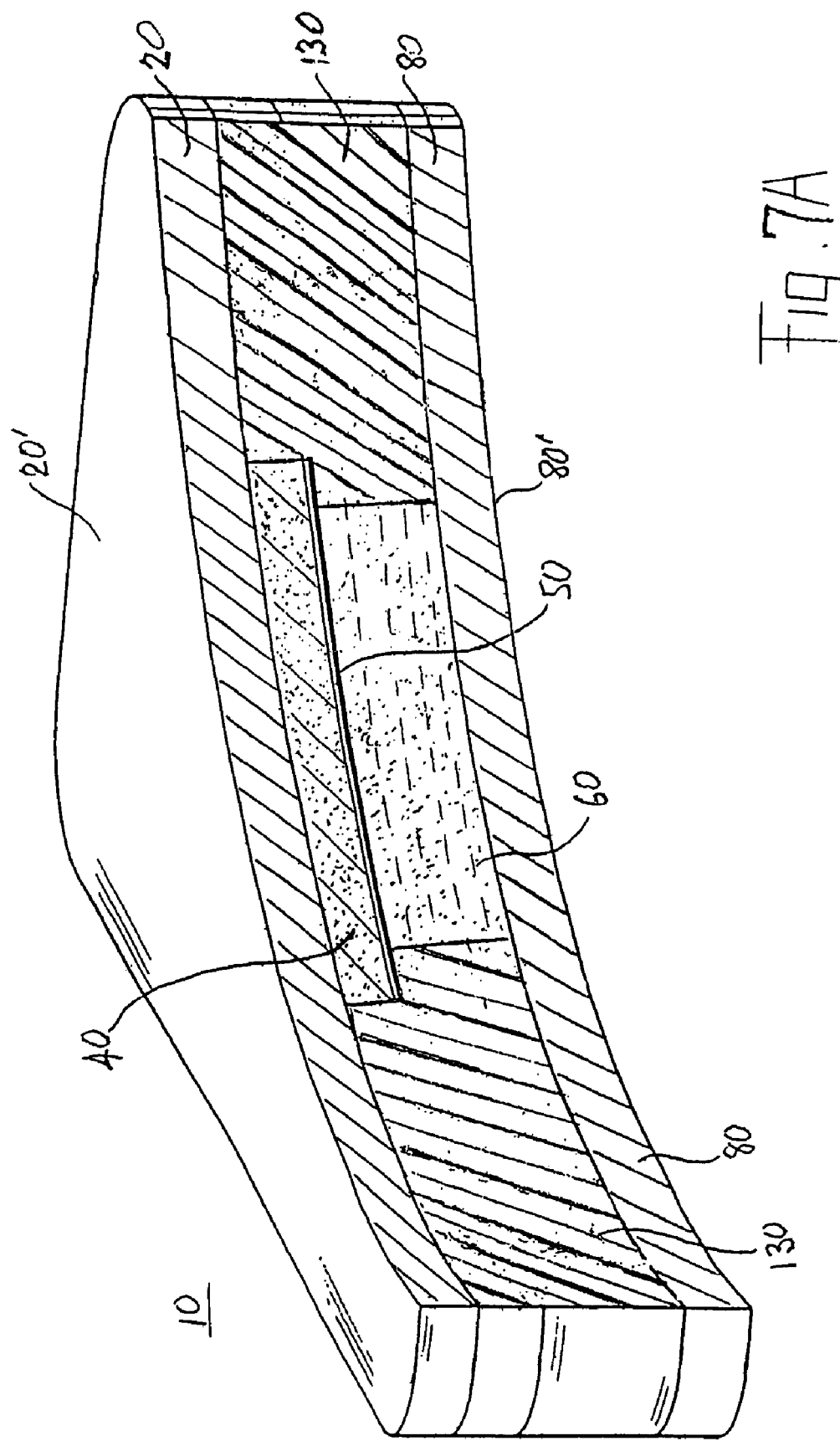
FIG. 7A is a cut away cross sectional view of a second embodiment of the wafer cell of FIG. 1 having a single frame construction.

An aspect of the present invention is to design the cell so that there is provided a long leak path for any electrolyte from the cell interior to traverse before it reaches an exterior point of escape. (This is in addition to providing the above described adhesives and adhesive sealants to the various cell components.) Thus, the wafer cell 10 of the invention is designed so frames 30 and 70 (or frame 130 in the case of the single frame embodiment shown in FIGS. 7A and 7B) have a frame edge width (e.g. between edges 33a and 37 shown in FIG. 4A or between edges 73a and 77 shown in FIG. 4B or between edges 130a and 137 shown in FIG. 7B) which is preferably at least as great as the total cell thickness. This provides a relatively long first leak blockage path "path A" for electrolyte to traverse from the cell interior to the outer end of the frame as shown, for example, in FIG. 2. Then the outer heat shrinkable film wrap 200 (which may comprise double film wraps 210 and 220 as shown in FIGS. 8A-8E) provides a second leak blockage path "path B". The blockage path B is defined as the distance from an exposed terminal contact (e.g. terminal contact 25) located on a conductive endplate (e.g. end plate 20) at a distance "B" (FIG. 2) from the outer peripheral edge of the frame (e.g. frame 30), which is at least a distance as long as the frame width, namely, a distance approximately equal to or greater than the cell thickness. In this context the total electrolyte leakage block path A+B (FIG. 2) is preferably at least twice the cell thickness. It will be appreciated that the same definitions to the leakage block paths A and B apply as well to the single frame 130 embodiment of the invention shown in FIGS. 7A and 7B.

Preferred discharge rates for cell 10 of the invention, for example, may be as great as about 15 to 45 milliwatts per cm$^2$ (13.5 to 40.5 milliAmp per cm$^2$). (The square centimeter area is based on the area at the anode/cathode interface.) A typical wafer cell 10 of overall dimensions 4 cm width×8 cm length×3 mm thick may accommodate a current drain rate of between about 1 and 1,000 milliAmp, preferably between about 10 milliAmp and 100 milliAmp.

Figure 5A:
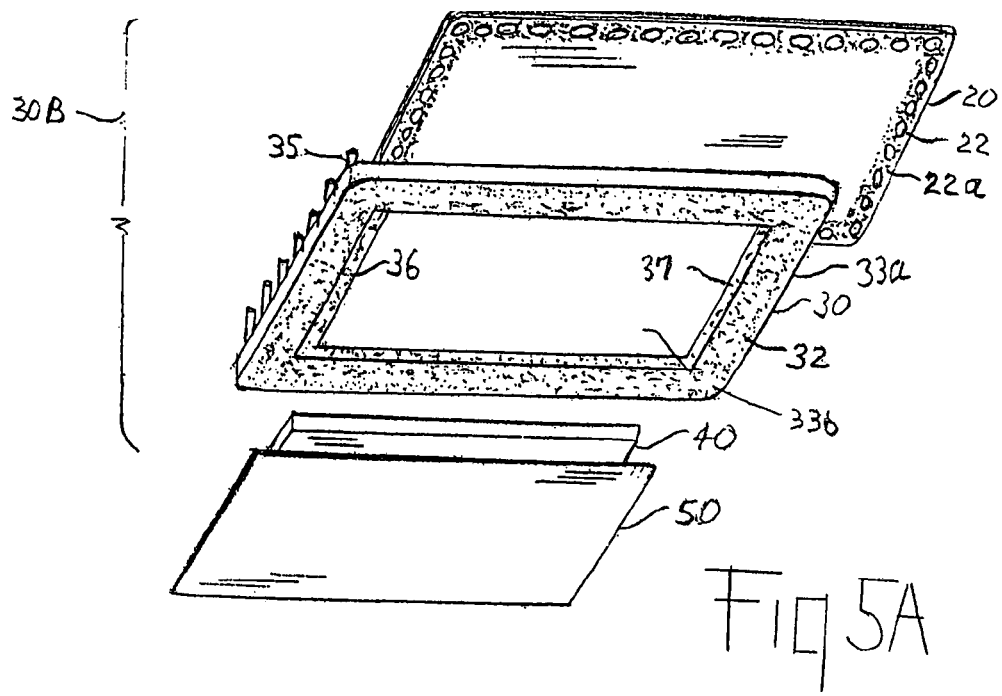
FIG. 5A is an exploded view showing components comprising a riveted anode assembly.
Figure 5B:
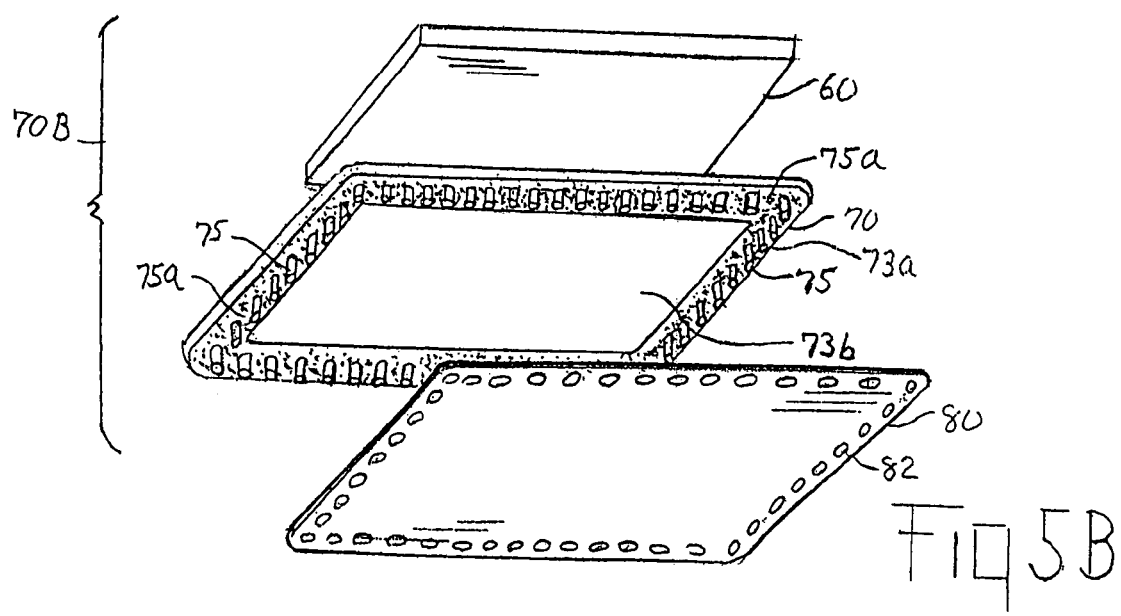
FIG. 5B is an exploded view showing components comprising a riveted cathode assembly.
Figure 6A:
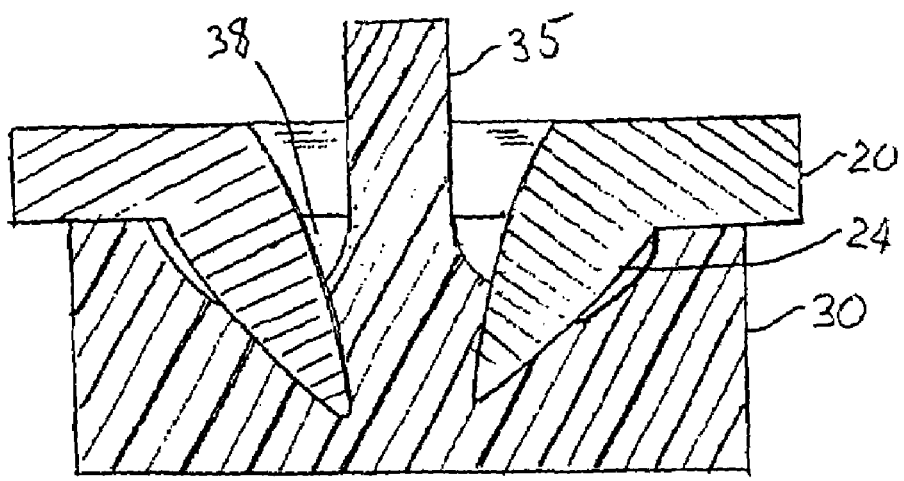
FIG. 6A is a cross section of the anode assembly of FIG. 5A showing rivets protruding from the anode plastic frame passed through apertures in the anode current collector sheet.
Figure 6B:
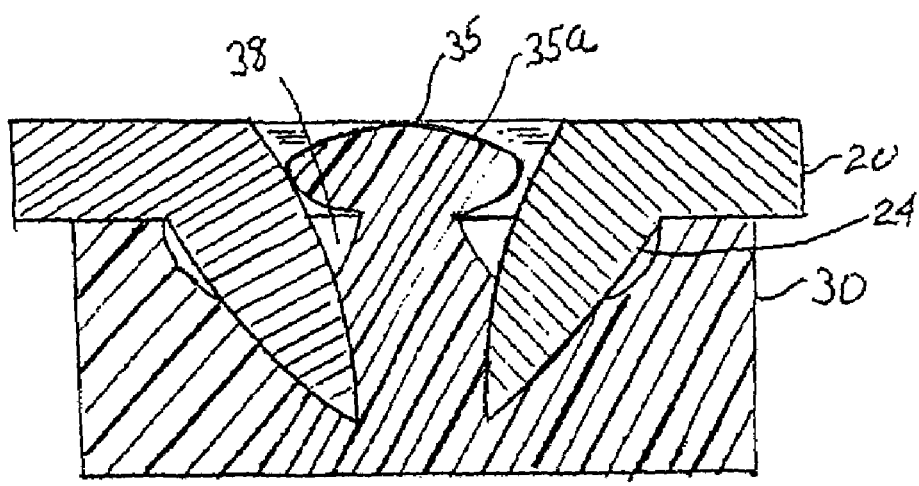
FIG. 6B is a cross section of the anode assembly of FIG. 5A showing the rivet heads laminated to lie below the surface of the anode current collector sheet.

In an alternative embodiment as shown in FIGS. 5A and 5B the structural integrity of the completed cell may be enhanced by integrally molding the anode frame 30 and cathode frame 70 to include protruding rivets next to the respective frame edges 33a and 73a. Such integrally molded rivets 35 are shown protruding from the back edge of the anode frame 30. Likewise, integrally molded rivets are shown protruding from the back edge of cathode frame 70. The anode current collector sheet 20 is provided with apertures 22 along its edge to mate with protruding rivets 35 on the anode frame 30. Likewise, the cathode current collector sheet 80 may be provided with apertures 82 along its edge to mate with protruding rivets 75 on the cathode frame 70. Thus, the anode current collector sheet 20 may be secured to anode frame 30 by inserting the rivets 35 through the apertures 22, and cathode current collector sheet 80 may be secured to the cathode frame 70 by inserting the rivets 75 through the apertures 82. The rivet heads may then be peened (laminated) by applying heat and pressure to them. Desirably a sealant may also be applied to the spaces between the rivet apertures 22 on the anode current collector sheet and spaces between the rivet apertures 82 on the cathode current collector sheet. A preferred sealant for such purpose may be a solvent based sealant having a sticky, functionalized polyethylene resin such that available under the trade designation J-43 Adhesive from Haerbin Renown Tech. Co. Ltd, China. In the embodiment shown in FIGS. 6A and 6B the protruding rivets 35 along the anode frame may have recessed bases protruding from shallow indented spaces 38 along the edge of the anode frame 30. Such configuration allows the rivet heads to recede to a level below the surface of the anode current collector sheet 20 after they are inserted into the current collector sheet apertures 22 and laminated. The same recessed rivet head configuration may be employed for rivets 75 protruding from the cathode frame 70.

The cell 10 has been made in accordance with embodiment shown in FIGS. 4A and 4B as well as the riveted embodiment shown in FIGS. 5A and 5B. In a specific construction employing the anode and cathode assemblies shown in FIGS. 4A and 4B, the cell had an overall thickness of 2.8 mm and a width of 1.5 inch (38.1 mm) and length of 1.5 inch (38.1 mm). The cell was discharged at various constant rates between 77.5 and 0.775 milliWatts/cm$^2$ to a cut off voltage of about 0.6 Volts (area based on the interfacial area between anode and cathode). The average load voltage was about 1.1 Volt during the discharge cycle to about 0.6 Volt cut off. Thus, the above Watt density range translates to a current drain density of between about 70.5 to 0.705 milliAmp/cm$^2$. In this range of discharge the cell bulged to a thickness of up to about 10 percent of its original thickness. The cell did not rupture, nor was there any leakage of electrolyte. In order to assure that the cell does not expand too tightly within an electronic device's battery cavity, it is recommended that such cavity be designed sufficiently larger than the cell or the cell be designed sufficiently smaller in thickness than the cavity opening to allow for a nominal 10 percent cell expansion.

In another preferred wafer cell embodiment (FIGS. 7A and 7B) a single frame 130 may be employed instead of the two frames 30 and 70 shown in the embodiment of FIGS. 4A and 4B. The single frame construction, preferably of plastic, has the advantage that the anode material 40 and cathode 60 can be packed into opposite sides of single frame 130 avoiding the need to bond individual frames together. The single frame 130 shown best in FIG. 7B, has an inner peripheral edge 132 surrounding a hollow interior space 133b. In the context of the single frame embodiment shown in FIGS. 7A and 7B the anode assembly comprises the anode current collector 20, anode 40, separator 50 and top side of frame 130. The cathode assembly comprises cathode current collector 80, cathode 60, and lower side of same frame 130. The anode current collector 20 and cathode current collector 80 are bonded to opposite sides of the frame, 130, to form a laminar cell construction.

Figure 7B:
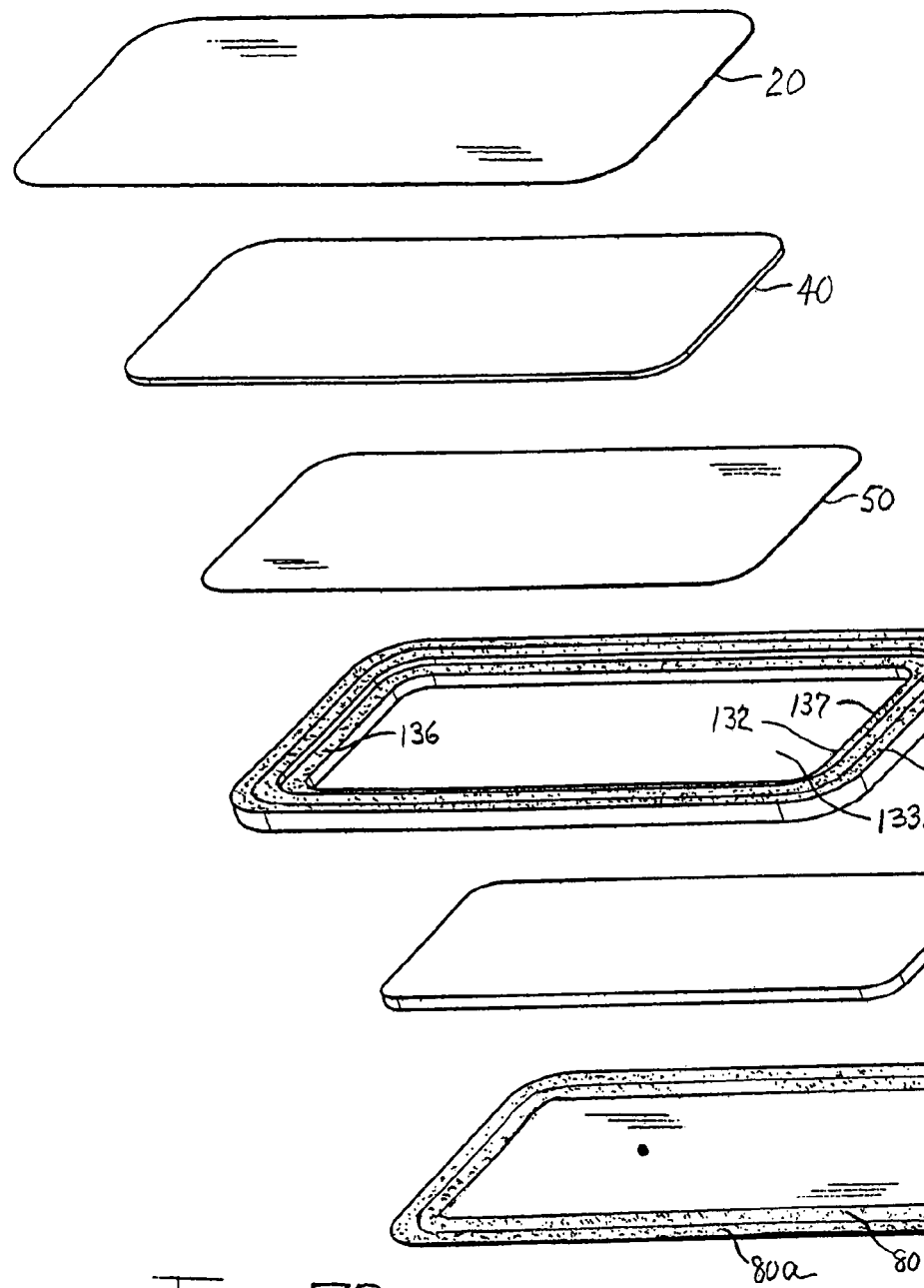
FIG. 7B is an exploded view of the wafer cell embodiment of FIG. 7A showing components comprising the anode and cathode assembly.

To effect cell construction for the embodiment employing a single frame (FIGS. 7A and 7B), adhesive 137 is applied to recessed ledge 136 along the inside edge of frame 130 (FIG. 7B).

Adhesive 137 may be a solvent based contact adhesive, for example, contact adhesive available under the trade designation 1357-L from 3M Company or a water-based contact adhesive available under the trade designation 30-NF from 3M. A preferred solvent base adhesive for application to ledge 136 comprises a solution of 10 wt. % high impact polystyrene and 90 wt. % toluene.

Separator sheet, 50, is bonded to recessed ledge 136 by contact adhesive 137. Alternatively, the separator sheet 50, may be welded directly to recessed ledge 136 by heat and pressure, or by ultra-sonics, without employing an adhesive.

Cathode 60 is pressed onto the exposed side of separator sheet 50. The cathode current collector sheet 80 is then applied over cathode 60 so that the edge of current collector sheet 80 contacts the edge of frame 130. The staged adhesives 80a and 80b hold the cathode current collector 80 securely bonded to the underside of frame 130 as may be inferred from FIGS. 7A and 7B.

Anode, 40 is extruded or pressed onto the opposite exposed side of separator sheet 50. The anode current collector sheet, 20, is then applied over anode, 40, so that the edge of the current collector sheet 20 contacts the edge of the frame 130. The staged adhesives, 130A and 130b hold the anode current collector 20 securely bonded to the topside of frame 130 as in FIG. 7A.

A staged seal preferably is applied between outer edge 133a and inner edge 137 of frame 130. The staged seal may comprise a band of structural adhesive 130a (Adhesive A as described above) adjacent to the outer edge of the frame and a band of sealant material 130b (Adhesive-Sealant B) (adjacent to the inner edge of the frame). A single adhesive of homogenous composition may be applied between outer edge 133a and inner edge 137 of frame 130 instead of the staged seal, however, the staged seal is preferred because it provides a better system for sealing out electrolyte.

A similar staged adhesive may be applied to the opposite side of frame 130 or along the edge of cathode current collector sheet 80. The latter is shown in FIG. 7B. The staged adhesive comprises a structural adhesive 80a (Adhesive A as described above) adjacent to the outer edge of cathode current collector sheet 80 and a band of sealant material 80b (Adhesive-Sealant B) adjacent to the inner edge of cathode current collector sheet 80. A single adhesive of homogenous composition may be applied instead of the staged adhesive, however, the staged adhesive is preferred because it provides a better system for sealing out electrolyte.

By way of a nonlimiting example, for a wafer thin cell 10 (4 mm thickness) having a footprint size of 1.5 inch by 3.0 inch (38.1 mm×76.2 mm) a typical operating current drain may be between about 1 milliAmp to about 2,000 milliAmp, typically between about 10 and 250 milliAmp, more typically between about 10 and 100 milliAmp. It will be appreciated that in general larger size cells 10 of the invention (in terms of their anode/cathode interfacial area, not thickness) will allow the cell to exhibit good performance at higher and higher current drain demands.

In the case of certain types of zinc powder alloys, zinc particle sizes and with certain types of anode current collectors, the anode may produce hydrogen gas faster than it can diffuse to the cathode and be oxidized by the cathode material to form water. Thus, some form of gas management system may be required. In particular, a system to vent the accumulated hydrogen gas may be needed. This could for example take the form of a tube of gas permeable polymer having a porous insert disposed throughout its length, the tube traversing the anode cavity and terminating beyond the outer edge of the plastic frame, similar to that disclosed by Polaroid Corporation in U.S. Pat. No. 4,105,831.

Wafer Cell Embodiments Comprising A Sealing Metal

The sealing properties at the interface between the anode current collector sheet 20 and plastic anode frame 30 can be improved by precoating the inside surface of an anode current collector sheet with a thin layer of a sealing metal before adhesives, are applied to bond the anode current collector sheet 20 to the plastic frame 30. Thus, instead of contacting the anode current collector surface directly, adhesives such as the above mentioned staged adhesives 20a and 20b, will contact the sealing metal 300 (FIG. 10A) precoated onto the anode current collector sheet 20. This has been determined to improve the sealing properties, particularly the long term strength and uniformity of the adhesive seal at the interface between the anode current collector sheet and plastic anode frame. Alternatively, the anode current collector sheet 20 may itself be formed of a sealing metal 300 so that the adhesive lies between the sealing metal 300 and the plastic frame 20 to bond the two together.

Although the above described wafer cell embodiments FIGS. 1-9C provide adequate sealing for the cell during both cell storage and normal usage, additional improvements to the seal are presented herein. The improvements will be described principally with respect to sealing components comprising the anode assembly, for example, anode assembly 30A (FIG. 4A). However, it will be appreciated that such improvements can be applied as well to sealing components comprising the cathode assembly, for example, cathode assembly 70A.

As described above one or more adhesives, for examples, staged adhesive seal 20a and 20b (FIG. 4A), may be used to bond anode current collector sheet 20 to frame edge 30. For example, a band of structural adhesive 20a (Adhesive A described above) adjacent to the outer edge 33a of the anode frame 30 and a band of sealant material 20b (Adhesive-Sealant B described above) adjacent to the inner edge 37 of the frame may be applied as shown in FIG. 4A. A single adhesive of homogenous composition may be applied instead of the staged adhesive seal, however the staged seal is preferred because it provides a better system for sealing out electrolyte at the interface between anode current collector sheet 20 and plastic anode frame 30.

It has been determined that the sealing properties at the interface between the anode current collector sheet 20 and plastic anode frame 30 can be improved by precoating the inside surface of anode current collector 20 with a thin layer of a sealing metal 300 (FIG. 10A) before the adhesives, such as adhesives 20*a* and 20*b*, are applied thereto. Thus, instead of contacting the anode current collector 20 surface directly, adhesives, such as adhesives 20*a* and 20*b*, will contact the sealing metal 300 precoated onto the anode current collector 20. This has been determined to improve the sealing properties, particularly the long term strength and bond uniformity of the adhesive seal at the interface between the anode current collector 20 and plastic anode frame 30.

By way of example, if the anode current collector sheet 20 is of copper, brass, bronze, tin or zinc, as above enumerated, then magnesium, zirconium or titanium is a preferred sealing metal to be precoated onto that portion of the anode current collector surface in contact with the adhesives, e.g. staged adhesives 20*a* and 20*b*, bonding the plastic anode frame 30 to the anode current collector sheet 20. (Magnesium or zirconium has been determined to be a particularly preferred sealing metal for current collector sheets of copper or brass.) Thus, the adhesive, whether a homogenous adhesive or a staged adhesive is used to bond the plastic anode frame to the anode current collector sheet, said adhesive will be in direct contact with the magnesium or zirconium sealing metal precoated onto the facing surface (normally the inside surface) of the current collector sheet. Such interface between the sealing metal coating and the adhesive appears to withstand degradation over long periods of time (for example, multiple years) thus preserving the bond between the plastic anode frame and anode current collector sheet of the alkaline wafer cell better than if the anode current collector sheet were not precoated with the sealing metal.

Although magnesium or zirconium are preferred sealing metals 300 for use in the context of the alkaline wafer cell 10 of the invention, other metals can also be used in similar manner as a precoat on the anode current collector surface before adhesive is applied thereto to bond the plastic anode frame to the current collector. Such list of sealing metals include magnesium (Mg), zirconium (Zr), titanium (Ti), hafnium (Hf), scandium (Sc), and yttrium (Y) and the lanthanide series elements (La, Ce, Pr, Nd, Pm, Sm, Eu, Gd, Tb, Dy, Ho, Er, Tm, Yb, Lu). Of these elements magnesium (Mg), titanium (Ti), zirconium (Zr), hafnium (Hf), and yttrium (Y) are preferred considering the overall factors of availability, function, and cost.

The sealing metal may be applied to the inside surface of anode current collector sheet 20 in a uniform thickness of between about 0.10 to 50.0 micron, typically between about 1 and 5 micron, for example, about 3 micron. Alternatively, the anode current collector sheet 20 may itself be formed of the sealing metal. In such case the anode current collector sheet may typically have a thickness of between about 6 and 10 mils (0.152 and 0.254 mm).

Although the preferred sealing metals 300 are in their pure elemental form, it is not intended to restrict the sealing metal to pure metals, since alloys of the sealing metal, for example, alloys of magnesium (Mg), zirconium (Zr), titanium (Ti), hafnium (Hf), scandium (Sc), and yttrium (Y), may also be employed. In such case it is preferred to have the pure sealing metal, for example, magnesium or zirconium or combination thereof as a major component of the alloy. However, benefits can also be realized if the pure sealing metal is a minor component of the alloy. By way of non limiting example, specific alloys of magnesium which are desirable are as follows: Homogeneous alloy 2% Mg, balance Cu or homogeneous alloy 5% Mg, balance Cu, or Alloy 4800 A (Belmont Metals, New York, N.Y.) containing 20% Mg, balance Cu.

Conventional techniques can be used to coat the surface of anode current collector sheet 20 or cathode current collector sheet 80 with the sealing metal. Such conventional techniques include for example, vacuum deposition, sputtering, ion plating, plasma deposition, jet assisted plasma deposition, sintering, cold metal spraying, detonation gun spraying, high velocity oxygen fuel spraying, electroplating (from non-aqueous electrolyte) or hot dipping (dipping the anode current collector sheet into a bath of the molten sealing metal).

It has been determined that coating a sealing metal 300 onto the anode current collector sheet 20, preserves the adhesive bond between collector sheet 20 and plastic frame 30 better in an alkaline environment than if the current collector sheets 20 were not so coated. This is believed due at least in part to the fact that the native oxide metal film formed by such sealing metal coating is essentially insoluble in alkaline electrolyte. Therefore, the adhesive bond which chemically involves such native oxide resists degradation even when exposed to an alkaline environment. Alternatively, the anode current collector sheet 20 may itself be formed of the sealing metal or alloys thereof. Additionally, the above enumerated sealing metals have the property that their oxides and hydroxides are not reduced in the presence of anode active material such as zinc. Such property also serves to preserve the strength and uniformity of the interfacial bond between the anode current collector sheet 20 and plastic frame 30 (FIGS. 4A and 10B).

Figure 10A:
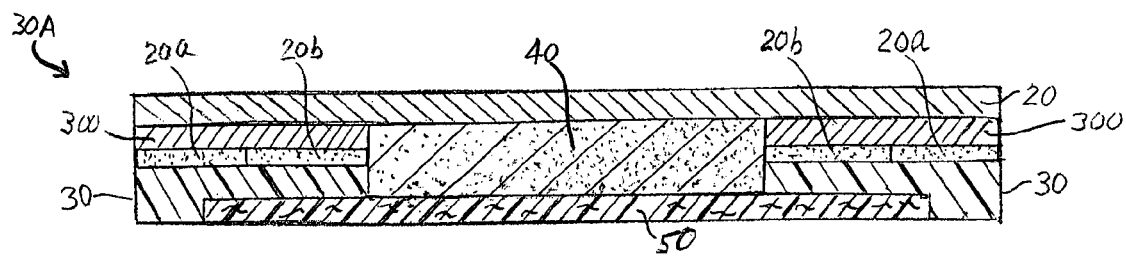
FIG. 10A is a cross sectional elevation view of the cell of FIG. 1 taken along site lines 3-3 showing the components comprising the anode assembly in an embodiment utilizing a sealing metal of the invention as a coating on the anode current collector.
Figure 10B:
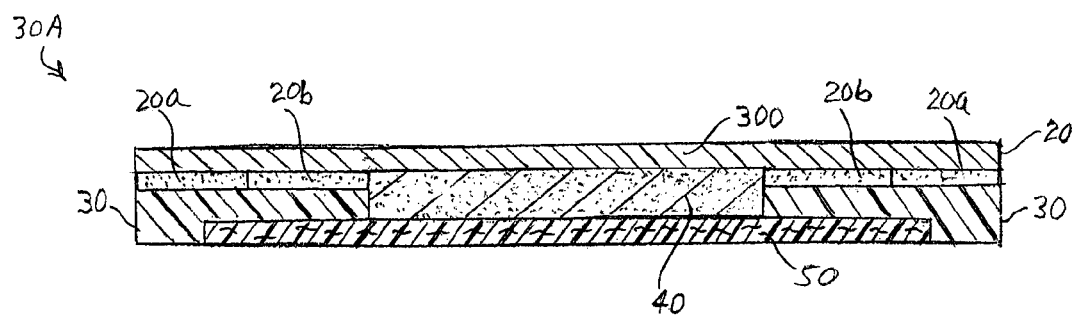
FIG. 10B is a cross sectional elevation view of the cell of FIG. 1 taken along site lines 3-3 showing the components comprising the anode assembly in another embodiment utilizing a sealing metal of the invention as the anode current collector.

Various embodiments of the anode assembly 30A (FIG. 4A) utilizing a sealing metal coating 300 on the inside surface of anode current collector sheet 20 are shown in FIGS. 10A-10G. A number of different sealing metal coatings may be used, but the most desirable have been determined to be coatings of magnesium or zirconium metal. The sealing metal coating 300 is desirably applied in its pure elemental form, for example, a thin coating of magnesium or zirconium metal on the inside surface of anode current collector 20, but the sealing metal may also be in alloy form, desirably an alloy of magnesium or alloy of zirconium. It not necessary to coat the entire inside surface of the anode current collector 20 with the sealing metal. However, when a sealing metal 300 is used, it should be precoated onto at least the portion of the inside surface of the anode current collector 20 to which one or more adhesive sealants, for example, staged sealants 20*a* and 20*b*, are to be applied as shown in FIG. 10A. Thus, the sealing metal coating is typically applied circumferentially to cover the portion of inside surface of the anode current collector 20 which faces frame 30. The anode frame 30 (frame border) may typically be between about ⅛ and ¼ inch (3.18 mm and 6.35 mm) in width which allows enough room for the adhesive to be applied. The use of the sealing metal 300 on the inside surface of anode current collector 20 shows particular utility for enhancing the sealing properties of the anode assembly 30A as the frame 30 width is made smaller, that is, closer to ⅛ inch or even less.

FIGS. 10A-10G are examples of various embodiments of the anode assembly 30A incorporating the use of the sealing metal 300 of the invention.

FIG. 10A shows an embodiment of the anode assembly 30A similar to that shown in FIG. 4A except that the portion of the anode current collector 20 facing the staged adhesive sealants 20*a* and 20*b* has been precoated with a sealing metal 300. The preferred sealing metal 300 for this embodiment comprises elemental magnesium or zirconium. It is preferred to apply the sealing metal coating. 300 circumferentially to the inside surface of anode current collector 20 just along the portion of said inside surface of the current collector that directly faces the total width of staged adhesive sealants 20*a* and 20*b*. In this manner direct exposure of the sealing metal surface to the anode material 40 can be avoided, if so desired. Although a coating of magnesium can be directly exposed to an anode 40 comprising zinc, direct exposure of a coating of zirconium to such zinc anode 40 may contribute to cell gassing under some circumstances and should therefore to be avoided.

The sealing metal coating 300 (FIG. 10A) such as elemental magnesium or zirconium may be applied to the inside surface of anode current collector 20 by conventional techniques such as by vacuum metallization. However, other conventional methods of applying the sealing metal 300 to the anode current collector 20 can be used. For example, the sealing metal may be applied by employing the techniques of sputtering, ion plating, plasma deposition, jet assisted plasma deposition, sintering, cold metal spraying, detonation gun spraying, high velocity oxygen fuel spraying, electroplating (from non-aqueous electrolyte) or by hot dipping (dipping the anode current collector into a bath of the molten sealing metal). The sealing metal 300 preferably of elemental magnesium or zirconium, may be applied to the inside surface of anode current collector 20 in a uniform thickness of preferably between about 0.10 and 50 micron, for example, about 3 micron. Although elemental magnesium or zirconium is preferred, the sealing metal 300 may be an alloy of magnesium or zirconium, preferably wherein the magnesium or zirconium (or both together) comprises the majority component of the alloy.

A preferred current collector sheet 20 shown in FIG. 10A is of copper. However, anode current collector 20 may desirably also be of brass or bronze. Current collector sheet 20 is desirably between about 6 and 10 mil (0.152 and 0.254 mm) in thickness. Although a single adhesive may be employed it is preferred to apply a staged adhesive 20*a* and 20*b* to the top side of anode frame 30. The staged adhesive comprises a band of structural adhesive 20*a* (Adhesive A described above) adjacent to the outer edge of the frame and a band of sealant material 20*b* (Adhesive-Sealant B described above) adjacent to the inner edge of the frame. A single adhesive of homogenous composition may be applied instead of the staged seal, however the staged seal is preferred because it provides a better system for sealing out electrolyte. The adhesive coated frame is then applied to the edge of the anode current collector so that it contacts the sealing metal 300 which forms an interface between the anode current collector 300 and staged adhesive 20 and 20*b*. A preferred material for frame 30 is high impact polystyrene (HIPS), acrylonitrile-butadiene-styrene (ABS), polysulfone, or polyvinyl-chloride (PVC) plastic. The separator 50 shown in FIG. 10A may be of material conventionally employed in alkaline cell separators. The separator 50, for example, may be comprised of a non-woven sheet of polyvinylalcohol fibers laminated to a cellophane film.

FIG. 10B shows an embodiment of the anode assembly 30A wherein the copper current collector 20 is replaced entirely with a current collector of magnesium or zirconium sheeting of same or similar thickness. That is, the thickness of current collector 20 is desirably between about 6 and 10 mil (0.152 and 0.254 mm). The use of a magnesium or zirconium current collector sheet 20 avoids the need to separately coat any portion of the inside surface of a copper collector with sealing metal such as magnesium or zirconium. In this embodiment (FIG. 10B) the use of an anode current collector 20 of magnesium is preferred, since the exposure of zirconium metal to the zinc anode 40 can increase cell gassing during cell storage or during normal operation. However, the magnesium or zirconium interface with adhesive sealants 20*a* and 20*b* assures excellent bonding between current collector 20 and plastic frame 30 over long periods of time extending to multiple years of cell storage and usage. The remaining components including preferred staged adhesives 20*a* and 20*b* are the same as described with reference to the embodiment in FIG. 10A.

Figure 10C:
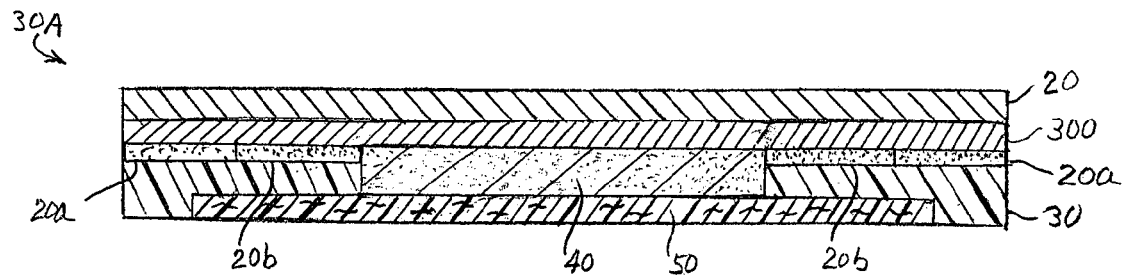
FIG. 10C is a cross sectional elevation view of the cell of FIG. 1 taken along site lines 3-3 showing the components comprising the anode assembly in another embodiment utilizing a sealing metal of the invention as a coating on the anode current collector.

FIG. 10C shows an embodiment of the anode assembly 30A with a current collector 20 of copper with a coating of sealing metal 300 of magnesium underlying the entire inside surface of the copper sheeting 20. The coating of magnesium 300 may have a thickness typically of about 0.10 to 50 micron, for example, about 3 micron underlying copper sheet 20. The combined thickness of sheeting 20 and 300 is between about 6 and 10 mil (0.152 and 0.254 mm). The remaining components including preferred staged adhesives 20*a* and 20*b* applied to anode frame 30 are the same as described with reference to the embodiment in FIG. 10A.

Figure 10D:
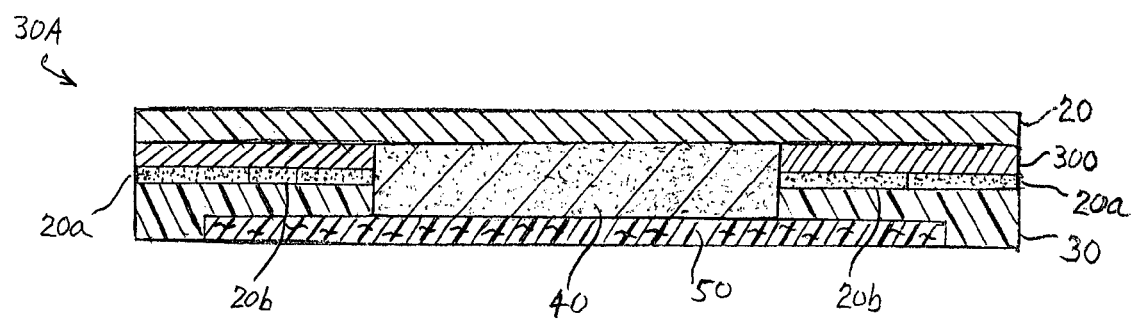
FIG. 10D is a cross sectional elevation view of the cell of FIG. 1 taken along site lines 3-3 showing the components comprising the anode assembly in another embodiment utilizing a sealing metal of the invention as a coating on the anode current collector.

FIG. 10D shows and embodiment of the anode assembly 30A with a current collector 20 of copper which has been coated with a thin layer of zirconium metal circumferentially to the inside surface of copper sheet 20 adjacent its peripheral edge. The zirconium layer is applied in a thickness of about 3 micron to the underside surface of copper anode current collector sheet 20 in a width which corresponds to the combined width of adhesive 20*a* and 20*b*, namely about the width of anode frame 30. The width of anode frame (frame border) 30 and consequently the width of the zirconium sealing metal 300 may typically be between about ⅛ to ¼ inches. This embodiment has the advantage of providing a zirconium contact surface for the staged adhesives 20*a* and 20*b* but yet does not expose the zirconium directly to the zinc anode material 40. As above mentioned it is preferred to avoid direct contact between the zirconium sealing metal and the zinc anode material 40, since such direct contact can contribute to cell gassing. The remaining components including preferred staged adhesives 20*a* and 20*b* applied to anode frame 30 are the same as described with reference to the embodiment in FIG. 10A.

Figure 10E:
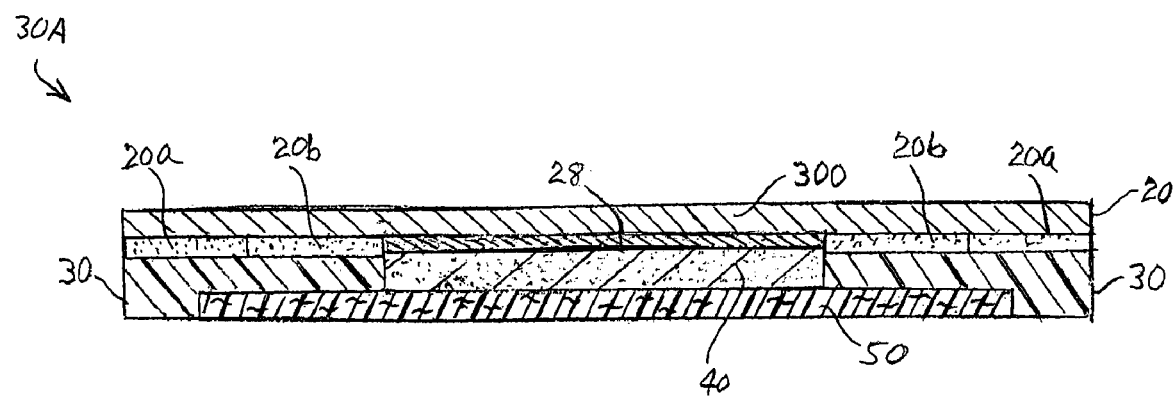
FIG. 10E is a cross sectional elevation view of the cell of FIG. 1 taken along site lines 3-3 showing the components comprising the anode assembly in another embodiment utilizing a sealing metal of the invention as the anode current collector.

FIG. 10E shows and embodiment of the anode assembly 30A with a current collector 20 of zirconium metal. The zirconium metal collector 20 directly contacts staged adhesives 20*a* and 20*b* as plastic frame 30 and current collector sheet 20 are bonded together. That is, the current collector sheet 20 of zirconium, itself functions as the sealing metal against adhesives 20*a* and 20*b*. However the central portion of the inside surface of the zirconium current collector 20 is coated or plated with a thin layer of copper 28 so that the zinc anode 40 will be exposed directly to said copper layer 28 instead of the zirconium to reduce the chance of cell gassing. In this embodiment the zirconium current collector 20 may have a thickness desirably between about 6 and 10 mil (0.152 and 0.254 mm) and the underlying copper layer 28 may have a thickness typically between about 0.5 and 5 micron, for example, about 3 micron. As above described the width of anode frame edge 30 and consequently the combined with adhesives 20*a* and 20*b* may typically be between about ⅛ to ¼ inches. The remaining components including preferred staged adhesives 20*a* and 20*b* applied to anode frame 30 are the same as described with reference to the embodiment in FIG. 10A.

Figure 10F:
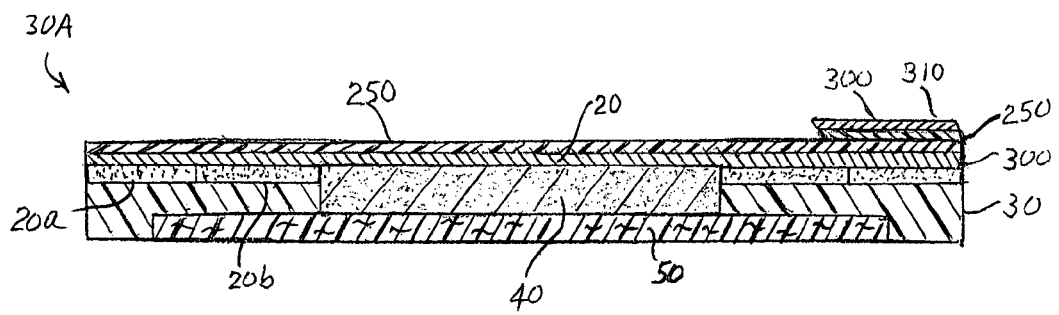
FIG. 10F is a cross sectional elevation view of the cell of FIG. 1 taken along site lines 3-3 showing the components comprising the anode assembly in another embodiment utilizing a sealing metal of the invention coated on a plastic film.
Figure 10G:
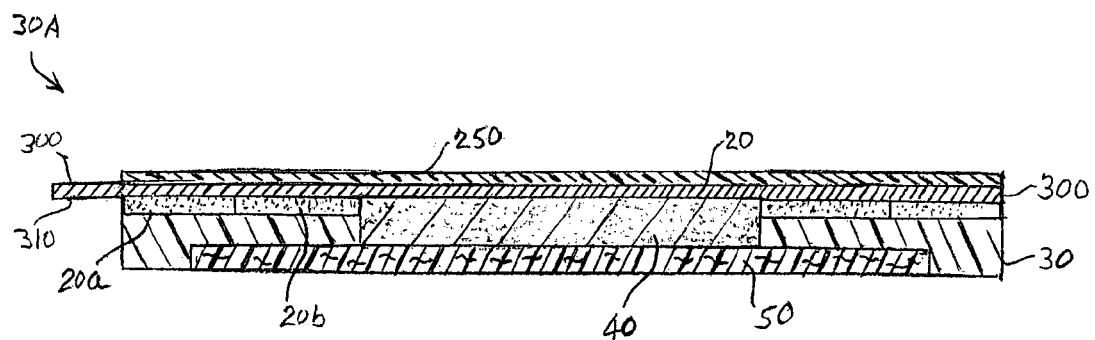
FIG. 10G is a cross sectional elevation view of the cell of FIG. 1 taken along site lines 3-3 showing the components comprising the anode assembly in another embodiment utilizing the sealing metals of the invention coated on a plastic film.

FIGS. 10F and 10G show embodiments wherein the anode current collector 20 is formed of a thin layer of magnesium sealing metal 300. The layer of magnesium may be coated onto a polymeric film 250, preferably a polyimide film by conventional vacuum metallization technique to form a magnesium/polymeric film laminate. The staged adhesives 20a and 20b bond the plastic frame 30 to the magnesium layer 20 as shown in FIGS. 10F and 10G. The polymeric film 250 provides a protective coating for the underlying magnesium layer. The magnesium layer 20 may have a thickness typically between about 0.2 and 2.0 mil (5 and 50 micron) the polymeric film 250 may have a thickness desirably between about 0.50 and 5.0 mils. In order to provide an anode terminal contact (negative terminal) a tab portion 310 of the magnesium/polymeric film laminate may extend from the cell edge and rolled over onto itself, thus exposing a portion of the magnesium layer 300 as shown in FIG. 10F. The exposed portion of the magnesium layer 300 in tab 310 (FIG. 10F) can function as the cell's negative terminal.

Alternatively, a portion of the magnesium layer 300 may be exposed away from the polymeric film 250 and may protrude from the cell edge to form a negative terminal contact tab 310 as shown in FIG. 10G. The embodiments shown in FIGS. 10F and 10G have the advantage of providing a direct contact between the anode current collector 20 and the staged adhesives 20a and 20b without need to additionally coat the anode current collector 20 with sealing metal. That is, the current collector 20 is itself formed of a sealing metal 300, namely magnesium. The embodiment shown in FIG. 10F also provides a protective film layer to protect the magnesium sealing metal 300 from direct contact with harsh external elements such as abrasive materials or acidic fluids and protects the thin magnesium later against mechanical abuse such as puncture with a sharp instrument. The remaining components including preferred staged adhesives 20a and 20b applied to anode frame 30 are the same as described with reference to the embodiment in FIG. 10A.

Other embodiments are possible wherein the anode current collector 20 is formed of a film laminate comprising at least one polymeric film layer and at least one multilayered metallic sheet thereon. The multilayered metallic sheet may comprise a metallic base film consisting essentially of a non-sealing metal and a coating thereon consisting essentially of a sealing metal covering at least a portion of the metallic base film.

The preceding embodiments were described with respect to use of sealing metals in the seal structure of flat alkaline cells having laminate construction, namely, non-crimped seals and flat negative current collectors. However, it will be understood that conventional alkaline cell constructions which employ rod, cylinder or cupped shaped anode (negative) current collectors may also advantageously employ sealing metals to improve seal integrity. In such constructions, the sealing metals are situated on the surface of the negative current collector, opposite the insulating sealing member (e.g., plastic insulating grommet or seal washer), with various sealants or adhesives disposed therebetween. Optionally, in such conventional alkaline cell constructions, e.g. cylindrical or button cells, where a crimping force is applied between the negative current collector and insulating grommet within the seal assembly, adhesives or sealants may be omitted entirely. In this case the negative current collector may desirably be precoated with the sealing metal or may itself be composed of the sealing metal. The insolubility and non-reducibility of the sealing metal native oxide or hydroxide films on the surface of the current collector will improve seal integrity, even in the absence of a supplemental sealant-adhesive application.

Thus the improvement in bonding the anode (negative) current collector to a portion of the insulating seal member (negative pass through portion) derived by employing a sealing metal therebetween is intended to apply to alkaline cells in general regardless of configuration. (In the embodiment described in FIG. 4A, in addition to housing anode 40, frame 30 also functions as an insulating sealing member preventing contact between anode current collector sheet 20 and the cell's cathode 60 or cell's positive side.)

For example, the portion of the elongated anode current collector nail 15 which passes through the insulating seal member 12 (plastic top) in the cylindrical alkaline cell shown in representative U.S. Pat. No. 4,740,435, can be precoated with the sealing metal of the present invention before said current collector nail 15 is bonded to the insulating sealing member 12 with asphalt sealant 17 (or equivalent). In the zinc/air button cell shown, for example, in U.S. patent publication 2002-0192545-A1 the portion of the outer surface of the anode casing side walls 163 (anode current collector) abutting the insulating seal member 172 could be precoated with the sealing metal of the present invention before the anode casing 163 is bonded to said insulating sealing member. The preferred sealing metal for such purpose as herein described is magnesium, zirconium, and titanium, but the sealing metal can also be selected from the above defined list.

By precoating said portion of the anode current collector (negative feed through portion) with the above defined sealing metal, particularly magnesium, zirconium, or titanium, the adhesive bond between anode current collector and insulating member is more alkaline resistant and generally resists degradation better over time than if that portion of the anode current collector were not so precoated with sealing metal. Alternatively, the anode current collector itself as a whole or the portion being bonded to the insulating member may itself be formed of the sealing metal. In this manner the adhesive seal between anode current collector and insulating member is improved and the chance of electrolyte leakage therethrough is reduced.

To improve the electrical contact qualities of the exterior negative terminal of the battery, that portion of the sealing metal surface which covers or constitutes the negative contact terminal, or fraction thereof, may be plated or coated with another metal having superior contact properties such as copper or nickel.

To lower the gassing rate from any portion of the sealing metal surface which directly contacts the negative active material or may be directly exposed to cell electrolyte inside the cell, e.g. zinc and KOH electrolyte, that portion of the sealing metal surface, or any fraction thereof, may be coated with another metal, which may under some circumstances have lower gassing characteristics than the sealing metal itself. For example, such other metal may be copper, tin, indium, zinc or alloys thereof.

Other embodiments of the invention are possible wherein the sealing metal, for example, magnesium or zirconium or any of the above named sealing metals can also be coated with compounds containing the same sealing metal, other than oxide or hydroxide, which are insoluble in alkaline electrolytes and are not reduced by zinc anode active material. For example, a sealing metal such as magnesium whether used in the form of an anode current collector sheet 20 or used as a coating on an anode current collector sheet such as copper or brass, can itself be coated with a protective layer. Such protective layer may be a magnesium fluoride ($MgF_2$) film applied by vacuum evaporation techniques, such as those used to overcoat optical components.

Also other configurations for the wafer cell 10 are possible and within the concept of the present invention. For example, the wafer cell 10 may have a continuous hole (not shown) through its center wherein such hole runs along the cell's short dimension between and completely through the opposing sides 20' and 80'. (Sides 20' and 80' define the cell's short dimension therebetween as shown in FIG. 1.) Such hole may be of varying size and may be centrally located or off center. The advantage of such embodiment is that the wafer cell 10 could then be secured onto a shaft connected to a device being powered, for example, a small spinning device and the like, which requires that the power cell be centrally positioned.

The wafer cell 10 could have a plurality of such continuous holes running between and completely through the cell's two opposing sides 20' and 80'. The holes may be of same size or different size and may be symmetrically or asymmetrically located. Specifically, a wafer cell 10 embodiment having an anode frame 30 and separate cathode frame 70 (FIGS. 1A-5B) or common anode and cathode frame 130 (FIGS. 7A-9C), can also have one or more such continuous holes running between and through opposing sides 20' and 80'. In the wafer cell 10 embodiment shown in FIG. 1 such holes would typically be aligned perpendicular to opposing parallel sides 20' and 80' and run completely through these sides.

The wafer cell 10 has an outer perimeter surface, for example, surfaces 110a, 110b, 110c, and 110d as shown in FIG. 1. A hole running between and through opposing sides 20' and 80' is defined by an inner peripheral surface within the cell between sides 20' and 80'. Such inner peripheral surface defines the hole boundary. Thus, when the wafer cell 10 has such hole running between and through opposing sides 20' and 80' the outer and inner perimeter surfaces do not touch or intersect with each other at any point. Similarly when there are a plurality of holes running between and completely through opposing sides 20' and 80' there will be an outer peripheral surface 110a, 110b, 110c, and 110d (FIG. 1) and a plurality of inner peripheral surfaces, one for each hole. That is, each one of the holes has a boundary defined by a separate inner peripheral surface. No one of the outer and inner perimeter surfaces touches or intersects with any other of said perimeter surfaces at any point.

Chemical Composition of a Representative Cell

The following description of cell composition regarding chemical composition of anode 40, cathode 60 and separator 50 is applicable to the representative wafer cell 10 disclosed in the above described embodiment.

In the above described cell 10, the cathode 60 comprises manganese dioxide and electrolyte, and an anode 40 comprises zinc, gelling agent and electrolyte. The aqueous electrolyte comprises a conventional mixture of KOH and zinc oxide. The anode material 40 can be in the form of a gelled mixture containing mercury free (zero-added mercury) zinc alloy powder. That is, the cell has a total mercury content less than about 100 parts per million parts (ppm) of zinc by weight, preferably less than 50 parts mercury per million parts of zinc by weight. The cell also preferably does not contain any added amounts of lead and thus is essentially lead-free, that is, the total lead content is less than 30 ppm, desirably less than 15 ppm of the total zinc in the anode. Such mixtures can typically contain aqueous KOH electrolyte solution, a gelling agent (e.g., an acrylic acid copolymer available under the tradename CARBOPOL C940 from Noveon (formerly from B.F. Goodrich)), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 60 for application to cell 10 of the invention is desirably a soft or semisolid cathode of the type described in U.S. Pat. No. 6,207,322 B1 incorporated herein by reference. However, it will be appreciated that more conventional solid manganese dioxide cathodes, e.g., having manganese dioxide content between about 87 and 93 percent by cathode weight could also be used. Nevertheless, it has been determined that the soft or semisolid cathode is desirable for application to the wafer cell of the invention because it can be readily molded into the cavity 73b within cathode frame 70. Moreover, such soft or semisolid cathode in the context of the adhesively secured cell of the invention is preferred, since it has been found to maintain close and uniform contact with the exposed surface of the cathode current collector 80 during the life of the cell. In the adhesively laminated cell 10 of the invention there are no strong compressive forces to hold a solid cathode in close and uniform contact with the cathode current collector and such contact may relax somewhat with time. Thus the soft or semisoft cathode is preferred.

The term "semisolid" as used herein is intended to broadly cover all physical states which are intermediate in property between true solid and true liquid. Thus, the term semisolid is intended to include (for example, but not by way of limitation) physical states having the soft texture and Theological properties commonly associated with putties and pastes. The semisolid material as used herein includes (for example, but not by way of any limitation) materials that are not free flowing as is a liquid but generally requires an external force in order to cause the material to move through a conduit. The term semisolid is also intended (for example, but not by way of any limitation) to apply to materials which are extrudable and which can be deformed without fracturing upon exertion of external pressure.

The desired semisolid cathode 60 for use in the wafer cell of the present invention can have the properties and range of composition as described in U.S. Pat. No. 6,207,322 B1 incorporated herein as follows:

Thus, the semisolid cathode 60 for cell 10 of the invention desirably comprises manganese dioxide in amount which is less than 80 percent by weight of the cathode and preferably between about 40 and 80 percent by weight, typically between about 45 and 78, more typically between about 45 and 70 percent by weight of the cathode. The semisolid cathode comprising manganese dioxide may be in the form of a putty or paste or a highly viscous material having a measurable viscosity.

The soft cathode 60 typically comprises $MnO_2$ (EMD) between about 45 and 78 wt. % of the cathode, more typically between about 45 and 70 percent by weight of the cathode, carbon black (Shawingan acetylene black or more preferably a graphitized carbon black such as MM 131 or MM 179 from Timcal, Belgium, as described in WO9703133), and aqueous KOH electrolyte solution (7-9 Normal). Preferably a small amount of graphite is also added. Advantageously, the carbon black preferably comprises between about 4 and 15 percent by weight of the semisolid cathode. The carbon black increases the conductivity of the semisolid cathode and provides an internal network to maintain the cathode in a semisolid state. The carbon black also acts as an electrolyte absorber and immobilizes the alkaline electrolyte solution so that free, fluid electrolyte is not evident. The graphite may comprise between about 1% and 10% weight percent of the cathode and improves the cathode conductivity. Desirably the semisolid cathode of the invention also comprises electrolyte solution comprising potassium hydroxide. The semisolid cathode may also comprise a binder such as polytetrafluroethylene, desirably comprising between about 0 and 2 percent by weight of the cathode. Optionally, less than 2 wt. % of a clay such as Laponite RDS clay from Southern Clay Products Company may be added to adjust the consistency.

The semisolid cathode 60 may have a porosity between about 30 and 70%, preferably between about 35 and 70%, more preferably between about 40 and 70%. Porosity here is taken to mean the volume fraction of the cathode comprised of non-solid materials, i.e. electrolyte+air. The semisolid cathode 60 may desirably also have a higher electrolyte content as a weight percent of total cathode than conventionally employed in solid $MnO_2$ containing cathodes for alkaline cells. The semisolid cathode material 60 may have a KOH content (pure) of between about 6 and 18 percent by weight of total cathode material and a total water content between about 9 and 27 percent by weight. The term KOH (pure) as used herein and in the examples with respect to KOH is the pure, anhydrous KOH content (i.e., without water) for calculation purposes.

The cathode porosity may be calculated by determining the volume occupied by electrolyte, other liquids and entrapped air (including volume of liquid and air entrapped within the pores of solids) and dividing that volume by the apparent volume of the cathode and multiplying by 100. (The apparent volume is the overall volume of a sample as contained within the external boundary of the sample.) The cathode porosity may be conveniently calculated by first obtaining the real density of each of the solids by conventional helium displacement method, before the solids are mixed into the cathode. (The real density of each solid is the solid sample weight divided by its real volume, that is, the solids sample apparent volume reduced by the volume occupied by entrapped air.) The respective weight of solids to be mixed into the cathode is then divided by their respective real densities to obtain the real volume of the solids in the cathode. The real volume of the solids is subtracted from the apparent volume of the cathode as a whole and this difference is divided by the cathode apparent volume×100 to yield porosity, percent.

The electrolytic manganese dioxide typically has an average particle size between about 1 and 100 micron, desirably between about 20 and 60 micron. The graphite is typically in the form of natural, synthetic or expanded graphite or mixtures thereof. The graphite can also comprise graphitic carbon nanofibers alone or in admixture with natural, synthetic or expanded graphite. Such cathode mixtures are intended to be illustrative and are not intended to restrict this invention.

The anode material 40 comprises: Zinc alloy powder 62 to 72 wt % (99.9 wt % zinc containing 200 to 500 ppm indium as alloy and plated material), an aqueous KOH solution comprising 38 wt % KOH and about 2 wt % ZnO; a cross-linked acrylic acid polymer gelling agent available commercially under the tradename "CARBOPOL C940" from Noveon (e.g., 0.5 to 2 wt %) and optionally a hydrolyzed poly-acrylonitrile grafted onto a starch backbone commercially available under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 10 and 100 ppm). The term zinc as used herein shall be understood to include zinc alloy powder which comprises a very high concentration of zinc, for example, at least 99.9 percent by weight zinc. Such zinc alloy material functions electrochemically essentially as pure zinc.

In respect to anode 40 of the laminar alkaline cell 10 of the invention, the zinc powder mean average particle size is desirably between about 1 and 350 micron, desirably between about 1 and 250 micron, preferably between about 20 and 250 micron. Typically, the zinc powder may have a mean average particle size of about 150 micron. The zinc particles in anode 40 can be of acicular or spherical shape. The bulk density of the zinc in the anode is between about 1.75 and 2.2 grams zinc per cubic centimeter of anode. The percent by volume of the aqueous electrolyte solution in the anode is preferably between about 69.2 and 75.5 percent by volume of the anode.

The cell 10 can be balanced in the conventional manner so that the mAmp-hr capacity of EMD (based on 410 mamp-hr per gram EMD) divided by the mAmp-hr capacity of zinc (based on 820 mAmp-hr. per gram zinc) is about 1. However deep discharge bulging can be reduced by balancing the cell so that the cathode is in excess. Thus, cell 10 can be balanced so that the total theoretical capacity of the EMD divided by the total theoretical capacity of the zinc is between about 1.03 and 1.10, desirably between about 1.05 and 1.08, preferably around 1.07 to reduce cell bulging.

TEST CELL EXAMPLE 1

A test cell 10 of square configuration as shown in FIGS. 1-3 was prepared. The test cell 10 had a length of 1.5 inches (38.1 mm), a width of 1.5 inches (38.1 mm) and an overall thickness of 2.8 mm. The anode current collector 20 was of copper and the cathode current collector 80 was of nickel. The cell 10 was tested without any label 200 applied to the cell's outer surface. The anode 40 and cathode 60 had the following composition.

| Anode Composition: | |
|---|---|
| | Wt. % |
| Zinc[1] | 69.9 |
| Surfactant[2] Solution (RM 510) | 0.12 |
| Electrolyte[3] (9 Normal KOH) | 29.98 |
| | 100.0 |

Notes:
[1] The zinc particles had a mean average particle size of about 150 micron and were alloyed and plated with indium to yield a total indium content of about 200 ppm.
[2] Organic phosphate ester-based surfactant solution RM 510 from Rhône Poulenc, 3% by wt. in $H_2O$.
[3] The electrolyte solution contained gelling agents Waterlock A221 and Carbopol C940 comprising in total about 1.5 wt. % of the electrolyte solution and about 2 wt. % ZnO.

| Soft (Semisolid) Cathode Composition #1: | |
|---|---|
| | Wt. % |
| $MnO_2$ (EMD) (Trona D from Kerr McGee) | 63.0 |
| Carbon (Shawinigan Acetylene Black 50% compressed) | 5.0 |
| Graphite[1] (Grafmax MP12 du natural graphite) | 2.0 |
| Electrolyte (9 Normal KOH) | 30.0 |
| | 100.0 |

Notes:
[1] Grafmax MP12 du natural graphite from Nacional De Grafite.

The anode plastic frame was composed of HIPS (high impact polystyrene) plastic material and had thickness of about 0.76 mm. The cathode plastic frame was composed of HIPS plastic material and had thickness of about 1.52 mm. The separator 50 comprised a non-woven sheet of polyvinylalcohol fibers laminated to a cellophane film. The cathode had 1.61 grams of $MnO_2$. The anode, cathode, electrolyte and separator comprised about 37 percent of the external volume the cell.

The cell was discharged in the following manner which gives an indication of the cell's performance over a spectrum of power demands.

The fresh cell 10 was first discharged at a power drain of 500 milliwatts (454 milliAmp) to a cut off voltage of about 0.6 Volt. The measured capacity was 37.1 milliwatt-hrs. The cell was rested for 1 hour and the same cell was then discharged at a rate of 250 milliwatts (227 milliAmp) to a cut off voltage of 0.6 volt. The measured incremental capacity for this drain was 100.4 milliwatt hours. The cell was rested for 1 hour and the same cell was then discharged at a rate of 100 milliwatts (90.9 milliAmp) to a cut off voltage of 0.6 volt. The measured incremental capacity for this drain was 90.19 milliwatt hours. The same cell was then incrementally discharged at 15 milliwatts, 10 milliwatts, and 5 milliwatts to 0.6 Volt cutoff, with 1 hour rest between each discharge. The incremental capacities the last three discharges was 30.99, 106.28, and 8.87 milliWatt-hours, respectively.

After the discharge test was completed, the cell was examined for bulging and leakage. It was determined that the cell expanded by about 10 percent in overall thickness, that is from a thickness of about 2.8 mm to 3.1 mm. There was no discernible electrolyte leakage.

TEST CELL EXAMPLE 2

With Magnesium Anode Current Collector Sheet

A test cell 10 of square configuration as shown in FIGS. 1-3 was prepared. The test cell 10 had a length of 1.5 inches (38.1 mm) and a width of 1.5 inches (38.1 mm). The cell was constructed using magnesium foil as the anode current collector sheet 20 using the anode assembly 30A configuration shown in FIG. 4A. The completed anode assembly 30A using the magnesium foil current collector 20 is shown in FIG. 10B. The magnesium foil 20 was 0.25 mm (0.01 in) thick and had a purity of 99.9% (metals basis). The cathode current collector sheet 80 was of nickel.

The magnesium anode current collector sheet 20 was secured and sealed to the backside of a high impact polystyrene (HIPS) plastic frame 30 (FIGS. 4A and 10B), 0.76 mm (0.030 in) thick and 6.35 mm (0.25 in) wide. The magnesium anode current collector sheet 20 was secured by employing a staged seal, composed of a band of structural adhesive 20a (Scotch-Weld 2216 Epoxy Adhesive from 3M) adjacent to the outer edge of the frame and a band of sealant material 20b (J-43 sealant from Harbin Jinxin Company, China) adjacent to the frame as shown in FIGS. 4A and 10B. Prior to assembly the backside of the high impact polystyrene (HIPS) plastic frame 30 was lightly abraded with silicon carbide abrasive and corona treated. 1.67 g of anode material 40, with the composition described in Example 1, was then pasted into the interior space 33b within frame 30 (FIG. 4A). A separator 50 composed of cellophane adhesively bonded to a non-woven layer comprising polyvinylalcohol fibers was placed on the recessed ledge 36 on the inside edge of frame 30 with the non-woven side being placed on the recessed ledge. Heat and pressure were then applied to the separator 50 that was in contact with the recessed ledge 36 to obtain bonding between the separator and the plastic frame 30. The completed anode assembly is shown best in FIG. 10B.

In a similar manner, a cathode assembly 70A (FIG. 4B) was prepared with a high impact polystyrene (HIPS) cathode frame 70, 1.52 mm (0.060 in) thick and 3.175 mm (0.125 in) wide and a cathode current collector sheet 80 composed of a 0.15 mm (0.006 in) thick acid-etched nickel foil. The acid-etched nickel current collector sheet 80 was adhesively bonded to the backside of frame 70 by employing a staged seal, composed of a band of structural adhesive 70a (Scotch-Weld 2216 Epoxy Adhesive from 3M) adjacent to the outer edge 73a of the frame and a band of sealant material 20b (J-43 sealant from Harbin Jinxin Company, China) adjacent to the frame inner edge 77. Prior to assembly the backside of the plastic frame 70 was lightly abraded with silicon carbide abrasive and corona treated. The interior surface of the etched nickel current collector sheet 80 was then coated with a conductive, carbon-based, coating (Electrodag 109B from Acheson).

A soft (semisolid) cathode of the following composition was prepared:

| Soft (Semisolid) Cathode Composition #2: | Wt. % |
|---|---|
| MnO2 (EMD) (Trona D from Kerr McGee) | 55.0 |
| Carbon (MM131 graphitized carbon black from Timcal Belgium) | 6.1 |
| Electrolyte (9 Normal KOH) | 38.9 |
| | 100.0 |

3.640 g of this soft cathode was pasted into the interior space 73b within frame 70.

The anode assembly 30A of FIG. 4A (shown completed in FIG. 10B) was then adhesively secured to the cathode assembly 70A (FIG. 4B) by applying a solvent-based cement (Weld-On 4807 from IPS Corp.) to both the free surfaces of the high impact polystyrene (HIPS) frames 30 and 70, thus forming the single laminate cell.

After assembly the OCV of the cell was measured to be 1.558V. The cell was then stored at 60° C.

Examination after 40 days storage at this temperature indicated no leakage or delamination where the magnesium current collector sheet 20 had been secured and sealed to the backside the plastic frame 30. (The cell storage at 60° C. for about 40 days is estimated to be equivalent to storage at ambient temperature (22° C.) of about 1 to 2 years.)

The cell of this example 2 comprising a magnesium sheet sealing metal for the anode current collector stored at least two weeks longer at 60° C. (before any electrolyte leakage was detected from the joint formed between the anode collector 20 and the plastic anode frame 30) than fresh cells of example 1 which did not contain a sealing metal in the anode current collector.

TEST CELL EXAMPLE 3

With Zirconium Anode Current Collector Sheet

A cell was prepared as described in Test Cell Example 2 but using 0.01 inches (0.25 mm) mm thick zirconium foil (99.5% metals basis) as anode current collector sheet 20 instead of the magnesium foil of Example 2. The cell was assembled with 1.68 g of anode material 40 and 3.131 g of soft cathode 60. All other cell components were the same as described in Example 2.

After assembly the OCV of the cell was measured to be 1.556V. The cell was then stored at 60° C.

Examination after 40 days storage at this temperature indicated no leakage or delamination where the zirconium current collector sheet 20 had been secured and sealed to the backside of the high impact polystyrene (HIPS) plastic frame 30. (The cell storage at 60° C. for about 40 days is estimated to be equivalent to storage at ambient temperature (22° C.) of about 1 to 2 years.)

The cell of this example 3 comprising a zirconium sheet sealing metal for the anode current collector stored at least two weeks longer at 60° C. (before any electrolyte leakage was detected from the joint formed between the anode collector 20 and the plastic anode frame 30) than fresh cells of example 1 which did not contain a sealing metal in the anode current collector.

Utilizing the design principles herein disclosed, thin alkaline cells of very large area, e.g. 8.5 in×11 in or 93.5 in$^2$ (approx. 21.6 cm×27.9 cm or 603 cm$^2$) or larger may be constructed. Other embodiments of the invention involving more complex frame designs are within the concept of the invention. For example, wafer cells can also be constructed with interior partitions or ribs within the frames, thus subdividing the interior of the anode frame or cathode frame into multiple volumes. By attaching these interior ribs to the endplates with adhesives, staged seals (sealant coating and adhesive coating in side by side arrangement) or sealant plus rivets, the overall cell structure can be mechanically reinforced to give greater stiffness and resistance to flexure. This feature will be especially useful for cells having a large area, providing extra protection to the outermost, peripheral seals against failure due to shear or peeling, caused by bending or twisting of the cell envelope.

Although the preferred embodiments of the invention have been described with respect to specific embodiments it will be appreciated that other embodiments are possible and are within the claims.

What is claimed is:

1. A wafer alkaline cell comprising a negative and a positive terminal, and a pair of opposing sides comprising at least the majority of the boundary surface of said cell, said opposing sides defining a short cell dimension therebetween, said short dimension being between about 0.5 and 6 mm, said cell comprising an anode assembly and a cathode assembly secured together forming a laminate structure, said anode assembly comprising an anode material and said cathode assembly comprising a cathode material therein, wherein said anode assembly comprises a housing for said anode, and said cathode assembly comprises a housing for said cathode, said anode and cathode assemblies being adhesively bonded together with a separator therebetween to form a laminate structure, wherein said anode housing comprises an anode frame having an inner peripheral edge defining the boundary of an anode cavity, an outer peripheral edge defining the outer boundary of the anode frame, said frame having a front side and opposing back side comprising said peripheral edges; said anode housing further comprising an anode current collector sheet bonded by adhesive material to the back side of said anode frame so that said anode current collector sheet faces an outer surface boundary of the cell, and wherein the anode material is disposed in said anode cavity so that it is in contact with said anode current collector sheet, wherein at least a portion of said anode current collector sheet is precoated with a sealing metal or comprises a sealing metal so that at least a portion of said adhesive material contacts at least a portion of said sealing metal when said anode current collector sheet is bonded to said anode frame.

2. The alkaline cell of claim 1 wherein said anode current collector comprises a film laminate comprising at least one polymeric film layer and at least one metallic sheet thereon consisting essentially of said sealing metal.

3. The alkaline cell of claim 1 wherein said anode current collector comprises a film laminate comprising at least one polymeric film layer and at least one multilayered metallic sheet thereon, said multilayered metallic sheet comprising a metallic base film consisting essentially of a non-sealing metal and a coating thereon consisting essentially of a sealing metal covering at least a portion of said metallic base film.

4. The alkaline cell of claim 1 wherein said sealing metal has the property of forming a metal film compound comprising at least one of a same metal oxide and same metal hydroxide on its surface when exposed to ambient air, and said metal film compound resists attack by alkaline electrolyte.

5. The alkaline cell of claim 4 wherein said metal film compound formed on the surface of said sealing metal is less soluble in alkaline electrolyte than said metal oxide or said metal hydroxide formed on the surface of said current collector uncoated with said sealing metal.

6. The alkaline cell of claim 4 wherein said metal oxide or said metal hydroxide formed on the surface of said sealing metal is essentially insoluble in alkaline electrolyte.

7. The alkaline cell of claim 1 wherein said anode comprises an anode active material undergoing electrochemical reaction when the cell is discharged and said sealing metal has a more negative electrochemical potential than said anode active material so that films of sealing metal compounds present on the surface of said sealing metal are not reduced by said anode active material in the presence of said alkaline electrolyte.

8. The alkaline cell of claim 1 wherein said anode comprises an anode active material comprising zinc and said sealing metal has a more negative electrochemical potential than said zinc so that films of sealing metal compounds present on the surface of said sealing metal are not reduced by said zinc in the presence of said alkaline electrolyte.

9. The alkaline cell of claim 1 wherein said sealing metal is selected from the group consisting of magnesium, zirconium, titanium, hafnium, scandium, yttrium, lanthanide series elements, and alloys thereof.

10. The alkaline cell of claim 1 wherein said sealing metal is selected from the group consisting of magnesium, zirconium, titanium, hafnium, scandium and yttrium, and alloys thereof.

11. The alkaline cell of claim 1 wherein said sealing metal is selected from the group consisting of magnesium, zirconium, and alloys thereof.

12. The alkaline cell of claim 1 wherein said anode frame comprises an organic polymer material.

13. The alkaline cell of claim 1 wherein said adhesive is selected from the group consisting of epoxy, polyamide, functionalized polyethylene, and asphalt.

14. The alkaline cell of claim 1 wherein said adhesive is selected from the group consisting of epoxy and asphalt.

15. The wafer cell of claim 1 wherein the anode material is selected from the group consisting of zinc, cadmium and metal hydride alloy; and the cathode material is selected from the group consisting of $MnO_2$, NiOOH, AgO, $Ag_2O$, CuO, $AgCuO_2$, $Ag_2Cu_2O_3$, and mixtures thereof.

16. The cell of claim 1 wherein the cell is a primary alkaline cell and the anode material comprises zinc and the cathode material comprises solids comprising manganese dioxide and an aqueous electrolyte solution comprising potassium hydroxide in admixture with said solids, wherein the cathode is a semisolid having a porosity between about 45% and 70%.

17. The cell of claim 16 wherein the cathode material further comprises graphitized carbon black.

18. The cell of claim 16 wherein the cathode material further comprises graphitized carbon fibers.

19. The cell of claim 1 wherein the cathode housing comprises a cathode frame having an inner peripheral edge defining the boundary of a cathode cavity, an outer peripheral edge defining the outer boundary of the cathode frame, said frame having a front side and opposing back side comprising said peripheral edges; said cathode housing further comprising a cathode current collector sheet bonded by adhesive to the back side of said cathode frame so that it faces an outer surface boundary of the cell, wherein the cathode material is disposed in said cathode cavity so that it is in contact with said cathode current collector sheet, wherein at least a portion of said cathode current collector sheet is precoated with a sealing metal so that said sealing metal contacts said adhesive when said cathode current collector sheet is bonded to said cathode frame.

20. The cell of claim 1 wherein said sides defining the short dimension of the cell therebetween comprise a pair of opposing sides parallel to each other.

21. The cell of claim 20 wherein the overall thickness of said cell is between about 0.5 and 6 mm, wherein said pair of sides are opposing sides, wherein said overall thickness is defined as the distance between the outside surface of said opposing sides of said cell.

22. The cell of claim 1 wherein at least a portion of the cell's perimeter is polygonal.

23. The cell of claim 1 wherein at least a portion of the cell's perimeter is curvilinear.

24. The cell of claim 1 wherein at least a portion of said cell outer surface has a curvature.

25. The cell of claim 1 wherein at least a portion of said outer surface has a compound curvature.

26. The cell of claim 1 wherein a portion of said cell outer surface has a convex curvature and another portion of said outer surface has a concave curvature as viewed from outside the cell.

27. The cell of claim 1 wherein the cell thickness is not uniform.

28. The cell of claim 1 wherein said cell is of cuboid shape.

29. The cell of claim 1 wherein the cell has an outer perimeter surface and an inner perimeter surface, wherein said outer and inner perimeter surfaces do not touch or intersect with each other at any point, wherein the inner perimeter surface defines the boundary of a continuous hole passing completely through both of said opposing sides of the cell defining a short cell dimension therebetween.

30. The cell of claim 1 wherein the cell has an outer perimeter surface and a plurality of inner perimeter surfaces, wherein no one of said perimeter surfaces touches or intersects with any other of said perimeter surfaces at any point, wherein the inner perimeter surfaces define a plurality of continuous holes, each continuous hole passing completely through both of said opposing sides of the cell defining a short cell dimension therebetween.

31. The cell of claim 1 wherein said cell is of rigid structure.

32. A primary alkaline cell comprising a negative and a positive terminal, and a pair of opposing sides comprising at least the majority of the boundary surface of said cell, said opposing sides defining a short cell dimension therebetween, said cell forming a laminate structure comprising an anode assembly and a cathode assembly, said anode assembly comprising a housing for an anode material comprising zinc and said cathode assembly comprising a housing for cathode material comprising manganese dioxide; wherein each of said anode and cathode housings comprises a common unit frame, said common frame forming at least a portion of each of said anode and cathode housings, said anode housing further comprising an anode current collector sheet bonded by adhesive material to the back side of said common frame so that it faces an outer surface boundary of the cell, and wherein the anode material is disposed in said anode cavity so that it is in contact with said anode current collector sheet, wherein said common frame has an inner peripheral edge defining an anode cavity on a first side of said frame and a cathode cavity on the opposing second side of said frame, wherein said anode material is disposed in said anode cavity on the first side of said frame and said cathode material is disposed in said cathode cavity in the opposing second side of said frame, wherein at least a portion of said anode current collector sheet comprises a metallic sheet precoated with a sealing metal or comprises a sealing metal so that at least a portion of said adhesive material contacts at least a portion of said sealing metal when said anode current collector sheet is bonded to said frame.

33. The alkaline cell of claim 32 wherein said anode current collector comprises a film laminate comprising at least one polymeric film layer and at least one metallic sheet thereon consisting essentially of said sealing metal.

34. The alkaline cell of claim 32 wherein said anode current collector comprises a film laminate comprising at least one polymeric film layer and at least one multilayered metallic sheet thereon, said multilayered metallic sheet comprising a metallic base film consisting essentially of a non-sealing metal and a coating thereon consisting essentially of a sealing metal covering at least a portion of said metallic base film.

35. The alkaline cell of claim 32 wherein said sealing metal has the property of forming a metal film compound comprising at least one of a same metal oxide and same metal hydroxide on its surface when exposed to ambient air, wherein said metal film compound resists attack by alkaline electrolyte.

36. The alkaline cell of claim 35 wherein said metal film compound formed on the surface of said sealing metal is less soluble in alkaline electrolyte than the film oxide formed on the surface of said current collector uncoated with said sealing metal.

37. The alkaline cell of claim 35 wherein said metal film compound formed on the surface of said sealing metal is essentially insoluble in alkaline electrolyte.

38. The alkaline cell of claim 35 wherein said anode comprises an anode active material undergoing electrochemical reaction when the cell is discharged and said sealing metal has a more negative electrochemical potential than said anode active material so that films of sealing metal compounds present on the surface of said sealing metal are not reduced by said anode active material in the presence of said alkaline electrolyte.

39. The alkaline cell of claim 35 wherein said anode comprises an anode active material comprising zinc and said sealing metal has a more negative electrochemical potential than said zinc active material so that films of sealing metal compounds present on the surface of said sealing metal are not reduced by said zinc in the presence of said alkaline electrolyte.

40. The alkaline cell of claim 32 wherein said sealing metal is selected from the group consisting of magnesium, zirconium, titanium, hafnium, scandium, yttrium, lanthanide series elements, and alloys thereof.

41. The alkaline cell of claim 32 wherein said sealing metal is selected from the group consisting of magnesium, zirconium, titanium, hafnium, scandium, and yttrium, and alloys thereof.

42. The alkaline cell of claim 32 wherein said sealing metal is selected from the group consisting of magnesium, zirconium, and mixtures thereof.

43. The alkaline cell of claim 32 wherein said common frame comprises an organic polymeric material.

44. The alkaline cell of claim 32 wherein said adhesive is selected from the group consisting of epoxy, polyamide, functionalized polyethylene, and asphalt.

45. The alkaline cell of claim 32 wherein said adhesive is selected from the group consisting of epoxy and asphalt.

46. The cell of claim 32 wherein the cathode material comprises solids comprising manganese dioxide and an aqueous electrolyte solution comprising potassium hydroxide in admixture with said solids, wherein the cathode is a semisolid having a porosity between about 45% and 70%.

47. The cell of claim 32 wherein said laminate structure has a separator between said anode material and said cathode material.

48. The cell of claim 32 wherein said anode housing further comprises an anode current collector sheet bonded to said first side of said common frame so that it faces an outer surface boundary of the cell, wherein said anode material is in contact with said anode current collector sheet.

49. The cell of claim 32 wherein said cathode housing further comprises a cathode current collector sheet bonded to said opposing second side of said frame so that it faces an outer surface boundary of the cell, wherein said cathode material is in contact with said cathode current collector sheet.

50. The cell of claim 32 wherein said pair of opposing sides of the cell are parallel to each other.

51. The cell of claim 32 wherein said cell is of cuboid shape.

52. The cell of claim 32 wherein said cell is of rigid structure.

53. The cell of claim 32 wherein the overall thickness of said cell is between about 0.5 and 6 mm, wherein said overall thickness is defined as the distance between the outside surfaces of said opposing sides of said cell.

* * * * *